US012519245B2

(12) United States Patent
Harel et al.

(10) Patent No.: US 12,519,245 B2
(45) Date of Patent: Jan. 6, 2026

(54) ANTENNA MODULE WITH FLEXIBLE ARRANGEMENT AND MANUFACTURING METHOD THEREOF

(71) Applicant: NOKIA SHANGHAI BELL CO., LTD., Shanghai (CN)

(72) Inventors: Jeanpierre Harel, Lannion (FR); Thomas Julien, Lannion (FR)

(73) Assignee: NOKIA SHANGHAI BELL CO., LTD., Shanghai (CN)

( * ) Notice: Subject to any disclaimer, the term of this patent is extended or adjusted under 35 U.S.C. 154(b) by 213 days.

(21) Appl. No.: 18/120,667

(22) Filed: Mar. 13, 2023

(65) Prior Publication Data

US 2023/0299491 A1 Sep. 21, 2023

(30) Foreign Application Priority Data

Mar. 16, 2022 (CN) ......................... 202210261590.8

(51) Int. Cl.

*H01Q 1/24* (2006.01)
*H01Q 1/42* (2006.01)
*H01Q 13/18* (2006.01)
*H01Q 21/26* (2006.01)

(52) U.S. Cl.

CPC ............... *H01Q 13/18* (2013.01); *H01Q 1/42* (2013.01); *H01Q 21/26* (2013.01)

(58) Field of Classification Search

CPC .......... H01Q 13/18; H01Q 1/42; H01Q 21/26; H01Q 1/2291; H01Q 5/378; H01Q 5/42; H01Q 1/246

See application file for complete search history.

(56) References Cited

U.S. PATENT DOCUMENTS 6,028,563 A * 2/2000 Higgins ................. H01Q 1/246 343/810
11,088,460 B2 * 8/2021 Sanjuan Flores ...... H01Q 5/307

(Continued)

FOREIGN PATENT DOCUMENTS

CN 200959368 Y 10/2007
CN 107408753 A 11/2017

(Continued)

OTHER PUBLICATIONS

Notification of the First Office Action dated May 30, 2024 corresponding to Chinese Patent Application No. 2022102615908, with English translation thereof.

(Continued)

*Primary Examiner* — David E Lotter
(74) *Attorney, Agent, or Firm* — SQUIRE PATTON BOGGS (US) LLP

(57) ABSTRACT

According to an aspect, an antenna module is provided. The antenna module comprises a chassis which comprises an opening or cavity at least partially. The antenna module further comprises one or more cantilever-type supporting elements which are mechanically connected, at one or more first ends of the one or more cantilever-type supporting elements, to a mechanical fixation location. The antenna module also comprises a first antenna array comprising one or more first antenna elements connected to one or more second ends of the one or more cantilever-type supporting elements for arranging the first antenna array over the opening or cavity. The one or more first antenna elements are mechanically connected to one or more radiating part handers that are assembled on an inner surface of a radome over the chassis. The radome is configured to hold the first antenna array.

15 Claims, 30 Drawing Sheets

(56) References Cited

U.S. PATENT DOCUMENTS

| | | | | |
|---|---|---|---|---|
| 11,581,631 | B2 * | 2/2023 | Li | H01Q 19/10 |
| 2016/0301124 | A1 | 10/2016 | Tai | |
| 2016/0305684 | A1 * | 10/2016 | Gray | B32B 37/14 |
| 2016/0329630 | A1 | 11/2016 | Mustajarvi et al. | |
| 2021/0218144 | A1 * | 7/2021 | Farzaneh | H01Q 21/24 |
| 2021/0305684 | A1 * | 9/2021 | Hou | H01Q 15/23 |
| 2021/0329630 | A1 * | 10/2021 | Futaki | H04L 5/0091 |

FOREIGN PATENT DOCUMENTS

| | | | |
|---|---|---|---|
| CN | 110034077 | A | 7/2019 |
| CN | 110247153 | A | 9/2019 |
| CN | 112599974 | A | 4/2021 |
| CN | 112713406 | A | 4/2021 |
| CN | 112909568 | A | 6/2021 |

OTHER PUBLICATIONS

Extended European Search Report dated Jul. 31, 2023, corresponding to European Patent Application No. 23161069.2.

Second Office Action dated Sep. 28, 2024, corresponding to Chinese Patent Application No. 202210261590.8, with English translation thereof.

Rejection Decision dated Dec. 16, 2024 corresponding to Chinese Patent Application No. 202210261590.8, with English translation thereof.

* cited by examiner

ANTENNA MODULE WITH FLEXIBLE ARRANGEMENT AND MANUFACTURING METHOD THEREOF

CROSS REFERENCE TO RELATED APPLICATION

This application claims the benefit of Chinese Patent Application No. 202210261590.8, filed Mar. 16, 2022. The entire content of the above-referenced application is hereby incorporated by reference.

FIELD

Embodiments of the present disclosure generally relate to an antenna, an antenna module and a manufacturing method thereof.

BACKGROUND

Antennas have been widely used in various base stations (e.g. 4G and 5G base stations) and terminal devices, for example, 5G MIMO (Multiple-Input Multiple-Output) antennas (i.e., which are integrated with radio transceiver elements to form a single unit of a massive antenna array or panel) and 4G (or lower band) antennas. Some types of antenna systems include multi-band antennas that may or may not have integrated 5G functions, such as antenna systems where integrate (5G) massive MIMO antennas are integrated with 4G (or lower-band) antennas. Such arrangement is advantageous in multiple aspects, for example, reducing the required materials, lowering the overall weight, and decreasing the entire wind load.

SUMMARY

In general, embodiments of the present disclosure provide an antenna, an antenna module and a manufacturing method thereof.

In a first aspect, a first antenna module is provided. The first antenna module comprises: a chassis comprising an opening or cavity at least partially; one or more cantilever-type supporting elements mechanically connected, at one or more first ends of the one or more cantilever-type supporting elements, to a mechanical fixation location; and a first antenna array comprising one or more first antenna elements connected to one or more second ends of the one or more cantilever-type supporting elements for arranging the first antenna array over the opening or cavity, the one or more first antenna elements being mechanically connected to one or more radiating part handlers that are assembled on an inner surface of a radome over the chassis, the radome being configured to hold the first antenna array. The one or more first antenna elements are mechanically connected to one or more radiating part handles that are assembled on an inner surface of a radome over the chassis. The radome is configured to hold the first antenna array.

In a variation, a distance in lateral or longitudinal to the chassis between the first antenna array and the mechanical fixation location is not limited. In a variation, the mechanical fixation location is disconnected or connected to the chassis. In a variation, the mechanical fixation location is at a position on the opposite side of the chassis with a certain distance. In a variation, no part of the first antenna module is fixed to the chassis. In a variation, a distance between the first antenna array and the chassis perpendicular to the chassis is one quarter of a wavelength of signals transmitted or received by the first antenna array. In a variation, a distance in lateral or longitudinal to the chassis between the first antenna array and the mechanical fixation location is a quarter, a half, one time, or two times of a wavelength of signals transmitted or received by the first antenna array.

In a variation, the first antenna module further comprises: a first power distribution means arranged in the cantilever-type supporting element for distributing power to and delivering power from the first antenna array. In a variation, the first power distribution means comprises one or more pairs of coaxial cables with one or more respective pairs of baluns mechanically connected to the cantilever-type supporting element. In a variation, the one or more pairs of coaxial cables are directly connected to a Phase Shifter Network block. In a variation, at least one of the one or more cantilever-type supporting elements has a curved or bent shape and/or is oriented at a non-right angle relative to the chassis.

In a variation, each of the one or more first antenna elements comprises a crossed dipole antenna element, the crossed dipole antenna element comprising one or more dipole arms on one side of a printed circuit board and a plurality of metal or alloy patches on the opposite side of the printed circuit board, the plurality of metal or alloy patches being connected to the dipole arms through metal or alloy deposited in corresponding through-holes formed in the printed circuit board so that each of the plurality of patches partially forms a capacitor with a corresponding dipole arm or exhibits a capacitor characteristic.

In a variation, the first antenna module further comprises a movable conductive layer on an opposite side of the chassis, being configured as a ground referential layer when the first antenna module operates in a stand-alone mode. In a variation, the first antenna module further comprises one or more frequency selective surfaces (FSS). In a variation, one of the frequency selective surfaces comprises at least a first surface fixed to the first antenna module and at least a second surface fixed to the second antenna module.

In a variation, the one or more first antenna elements are low band antenna elements used for 4G or even below frequency range. In a variation, the first antenna module further comprises the second antenna module mounted in the opening or the cavity, and the second antenna module is used for 5G or even higher frequency range. In a variation, the first antenna module further comprises a third antenna module mounted on the chassis which is located between the first antenna array and the second antenna module, being used for a middle frequency range. In a variation, the first antenna module is used in a terminal device or in a network device.

In a second aspect, a method of manufacturing a first antenna module is provided. The method comprises: assembling one or more radiating part handlers onto an inner surface of a radome; assembling a first antenna array by mechanically connecting one or more first antenna elements to the one or more radiating part handlers; mechanically connecting a cantilever-type supporting element, at a first end of the cantilever-type supporting element, to a mechanical fixation location; and arranging the radome on top of a chassis comprising an opening or a cavity at least partially. The one or more first antenna elements are connected to one or more second ends of the one or more cantilever-type supporting elements for arranging the first antenna array over the opening or cavity, and the radome is configured to hold the first antenna array over the chassis.

In a variation, a distance in lateral or longitudinal to the chassis between the first antenna array and the mechanical fixation location is not limited. In a variation, the mechanical fixation location is disconnected or connected to the chassis. In a variation, the mechanical fixation location is at a position on the opposite side of the chassis with a certain distance. In a variation, no part of the first antenna module is fixed to the chassis. In a variation, a distance between the first antenna array and the chassis perpendicular to the chassis is one quarter of a wavelength of signals transmitted or received by the first antenna array. In a variation, a distance in lateral or longitudinal to the chassis between the first antenna array and the mechanical fixation location is a quarter, a half, one time, or two times of a wavelength of signals transmitted or received by the first antenna array.

In a variation, the method further comprises: arranging a first power distribution means into the cantilever-type supporting element for distributing power to and delivering power from the first antenna array. In a variation, the first power distribution means comprises one or more pairs of coaxial cables with one or more respective pairs of baluns mechanically connected to the cantilever-type supporting element. In a variation, the one or more pairs of coaxial cables are directly connected to a Phase Shifter Network block. In a variation, at least one of the one or more cantilever-type supporting elements has a curved or bent shape and/or is oriented at a non-right angle relative to the chassis.

In a variation, each of the one or more first antenna elements comprises a crossed dipole antenna element, the crossed dipole antenna element comprising one or more dipole arms on one side of a printed circuit board and a plurality of metal or alloy patches on the opposite side of the printed circuit board, the plurality of metal or alloy patches being connected to the dipole arms through metal or alloy deposited in corresponding through-holes formed in the printed circuit board so that each of the plurality of patches partially forms a capacitor with a corresponding dipole arm or exhibits a capacitor characteristic.

In a variation, the method further comprises: fixing a movable conductive layer on an opposite side of the chassis, the movable conductive layer being configured as a ground referential layer when the first antenna module operates in a stand-alone mode. In a variation, the method further comprises: fixing one or more frequency selective surfaces (FSS). In a variation, the fixing one or more frequency selective surfaces comprises: fixing at least a first surface to the first antenna module; and fixing at least a second surface to the second antenna module.

In a variation, the one or more first antenna elements are low band antenna elements used for 4G or even below frequency range. In a variation, the method further comprises mounting the second antenna module in the opening or the cavity, where the second antenna module is used for 5G or even higher frequency range. In a variation, the method further comprises mounting a third antenna module on the chassis, where the third antenna module is located between the first antenna array and the second antenna module and being used for a middle frequency range. In a variation, the method further includes mounting the first antenna module to be used in a terminal device or in a network device.

BRIEF DESCRIPTION OF THE DRAWINGS

In the following, some example embodiments will be described with reference to the accompanying drawings, in which.

DETAILED DESCRIPTION OF EMBODIMENTS

Figure 1:
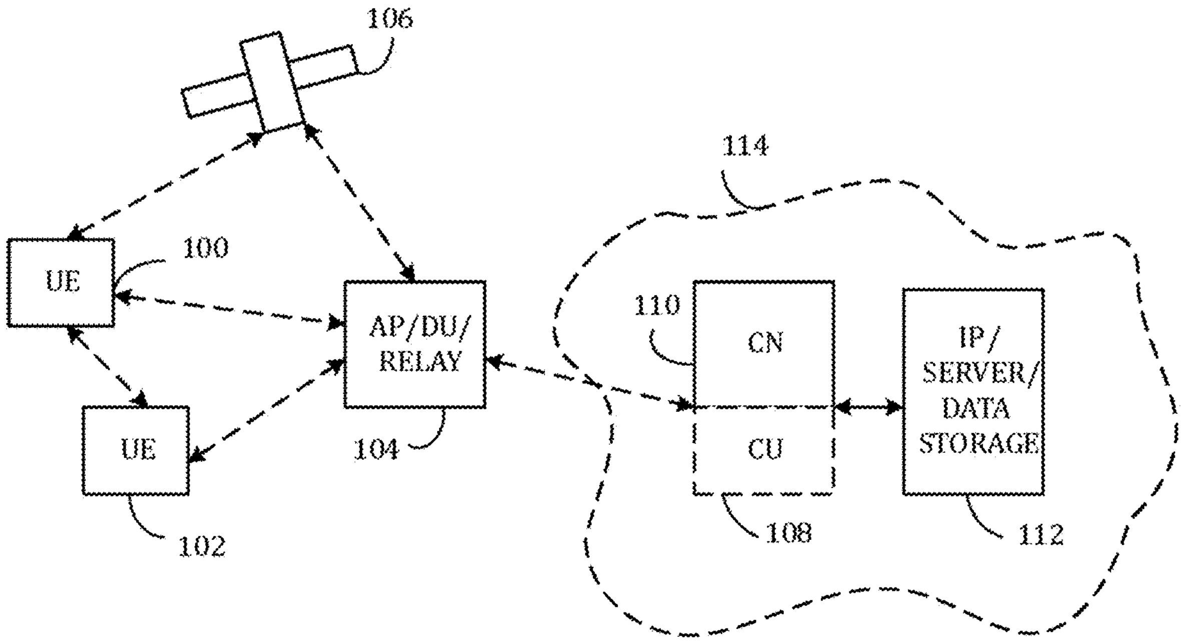
FIG. 1 illustrates an example of a communications system to which embodiments may be applied.

Reference will now be made to the various example embodiments shown in the drawings to illustrate the principle of the present disclosure. It would be appreciated that the description on those embodiments are provided merely to enable a person skilled in the art to understand and further carry out the present disclosure, without suggesting any limitation to the scope of the present disclosure. The present disclosure described herein may be implemented in various other manners than those described below.

In the above and following description, unless indicated otherwise, the technical terms used herein convey the same meanings as commonly understood by a person skilled in the art.

As used herein, "an embodiment," "one embodiment," "an example embodiment" or the like are to be read as that the embodiment described may include specific features, structures or characteristics, but not every embodiment comprises the specific features, structures or characteristics. In addition, those expressions do not necessarily refer to the same embodiment. Moreover, when a specific feature, structure or characteristic is described in combination with an example embodiment, it is to be understood that the impact of the combination (irrespective of whether explicit description has been provided nor not) with other embodiments on such feature, structure or characteristics is within the knowledge of a person skilled in the art.

It would be appreciated that, although "first," "second" and the like as used herein may be used to describe a variety of elements, those elements are not restricted by those terms. Those terms are only used to differentiate respective elements. As used herein, the term "and/or" includes one or more of any and all combinations of terms listed.

The embodiments below are provided exemplarily. Although "a," "an" or "some" embodiments may be referred to at multiple positions of the specification, this does not necessarily mean that the same embodiment is involved, or the feature is only applicable to a single embodiment. Rather, separate features of different embodiments may be combined to provide a further embodiment. It is also to be understood that "comprise," "comprising," "has," "having," "include" and/or "including" as used herein are to be read as presence of a feature, element and/or component, without excluding presence or addition of one or more other features, elements, components and/or a combination thereof.

As used herein, the term "communication network" refers to any network that follows any suitable communication standard (e.g. Wi-Fi, fifth generation (5G) systems, Long Term Evolution (LTE), LTE-Advanced (LTE-A), Wideband Code Division Multiple Access (WCDMA), High Speed Packet Access (HSPA), Narrowband Internet of Things (NB-IoT), and the like). In addition, communication between a terminal device and a network device in a communication network may be based on any suitable generation of communication protocol (including, but not limited to, the first generation (1G), the second generation (2G), 2.5G, 2.75G, the third generation (3G), the fourth generation (4G), 4.5G, a future fifth generation (5G) New Radio (NR) communication protocol, Wi-Fi1 through Wi-Fi7 and/or any other protocols currently known or to be developed in the future). Embodiments of the present disclosure can be applied in various communication systems. Considering the fast development of the communication, there may be future types of communication technologies and development that embody the present disclosure. It should not be construed as confining the scope of the present disclosure only to the above system.

As used herein, the term "network device" refers to a node in a communication network, via which a terminal device accesses a network and receives a service therefrom. Depending on the terms and the technology applied, a network device may refer to a base station (BS) or an access point (AP), such as a Node B (NodeB or NB), Long Term Evolution (LTE) (also known as "4G"), and/or or LTE-Advanced (LTE-A, also known as "4G+") communication system Evolved Node B (eNodeB or eNB), next generation (NR, also known as "5G") NodeB (gNB), remote radio unit (RRU), radio head (RH), remote radio head (RRH), relay, low power nodes such as femto, pico and the like. RAN split architecture includes a gNB-CU (centralized unit, used for hosting RRC, SDAP and PDCP) for controlling a plurality of gNB-DUs (distributed unit, used for hosting RLC, MAC and PHY). The respective antenna modules described herein may be applied in a network device.

The term "terminal device" refers to any terminal device capable of performing wireless communication. As an example, without limitation, the terminal device may also be called communication device, user equipment (UE), subscriber station (SS), portable subscriber station, mobile station (MS), station (STA) or access terminal (AT). The terminal device may include, but is not limited to, a mobile phone, a cellular phone, a smart phone, a Voice over IP (VoIP) phone, a wireless local loop phone, a tablet, a wearable terminal device, a personal digital assistant (PDA), a portable computer, a desktop computer, an image acquisition terminal device such as a digital camera and the like, a game terminal device, a music storage and playback device, an on-vehicle wireless terminal device, a wireless endpoint, a mobile station, laptop embedded equipment (LEE), laptop-mounted equipment (LME), a USB dongle, a smart device, wireless Customer Premise Equipment (CPE), an Internet of Things (IoT) device, a watch or other wearable device, a head-mounted display (HMD), a vehicle, a drone, a medical device and an application program (e.g. remote surgery), an industrial equipment and application program (e.g. a robot and/or other wireless device operating in an environment of industrial and/or automated process chain), a consumer electronic device, an equipment business operation and/or industrial wireless network, and the like. In the description below, the terms "terminal device," "communication device," "terminal," "user device," "STA" and "UE" may be used interchangeably. Various antenna modules described herein may be used in a terminal device.

In the following, embodiments of the present disclosure will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Although the functions described herein may be performed in a fixed and/or wireless network node in various example embodiments, the functions may also be implemented in a user equipment device (e.g., a cell phone, a tablet, a laptop computer, a desktop computer, a mobile IoT device, or a fixed IoT device) in other example embodiments. For example, the user equipment device may be appropriately equipped with respective capabilities described in conjunction with a fixed and/or wireless network node. The user equipment device may be, for example, a chipset or a processor configured to control user equipment when installed in the user equipment. Examples of the functions include a bootstrap server function and/or a home subscriber server, and from the perspective of the functions/nodes, it can be implemented in user equipment by providing the user equipment with software configured to be executed by the user equipment.

In the following, cantilever may be defined as a rigid structural element that extends (at least partially) horizontally and is supported at only one end. A cantilever-type supporting element may be, thus, defined as a supporting element being or acting as a cantilever.

FIG. 1 illustrates an example of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements (possibly forming an antenna array). The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MIE), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, more base stations or nodes than the LTE (a so-called small cell concept), including macro sites operating in cooperation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and is also expected to be able to be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or alike, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in the access node 104 (e.g., a distributed unit, DU)) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through the access node 104 (e.g., an on-ground relay node) or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or pico cells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In some embodiments, the system illustrated in FIG. 1 may be a system comprising one or more antenna systems. Specifically, the access node 104 may comprise an antenna system. An antenna system may be defined as an antenna system which integrates (5G) active MIMO antenna array with a (4G or lower) passive antenna array (or a singular antenna). An active antenna array is defined generally as an antenna array into which one or more active electronics components (i.e., active circuitry) have been integrated. Specifically, an active antenna array may be defined, here and in the following, as an antenna array to which a radio unit (being a radio transmitter, receiver or transceiver or a part thereof comprising active as well as passive elements) has been integrated.

The antenna system may specifically be an antenna system which integrates (5G) active massive MIMO antenna array with (4G or lower) passive antenna array (or a singular antenna). The term "massive MIMO antenna array" refers to a MIMO antenna array with a large number of individual antenna elements. In a massive MIMO (mMIMO) system, the number of antenna elements in a MIMO antenna array of an access node may be assumed to be larger than the number of terminal device served by that access node. For example, a massive MIMO antenna array may be defined, here and in the following, as a MIMO antenna array with at least 8, 16 or 32 antenna elements.

Some present antenna system solutions employ modular structures where the passive and/or active parts of the antenna system form separate but electrically (and physically) connected modules which may be independently detachable and replaceable, even "in the field" (i.e., on site). However, as multiple electrical connections typically exist between the active and passive parts or modules of the APA, the process of replacing said modules of the APA is often complicated and time consuming as this requires, first, removing all of electrical connections between the active and passive antenna modules. For example, in some solutions, the passive antenna module is not be detachable as a single part, but must, before detaching, be split into multiple smaller parts.

The embodiments seek to provide modular APA systems and modules thereof where the active antenna module (equally called the active module) and the passive antenna module (equally called the passive module) are separate entities not connected electrically (i.e., via RF connectors) for facilitating their removal and replacement.

In addition, modern multiband panel antennas require to integrate more and more array antennas within a unique and common global mechanical structure. This leads to multi-band antennas having 16, 18, 20 etc. ports, where "one" antenna body embeds in fact 16, 18, 20 or more antenna arrays. Moreover, the market trend of multiband panel antennas will continue to implement more and more antenna arrays within one solo body and in the meantime, will impose to reduce the width of those multi-band panel antennas. In such a case, a huge number of radiating elements within a more and more restricted area should be implemented.

However, the problem lies in that the density is so high that it becomes not physically possible (i.e., not mechanically possible) to place all the required radiating elements in a restricted area.

Although it is definitely not limited to these configurations, the problem can be illustrated by considering a multiband antenna panel including massive MIMO array antennas. If a specific antenna area must include, for example, a 5G MIMO array and some radiating elements linked to other antenna arrays, the physical gap remaining within each of the MIMO array radiating elements is extremely small, which is approximately dozens of millimeters, as compared with a standard physical size of an additional radiating element as required.

Unfortunately, there may be no physical space between the 5G radiating elements to mechanically fit those low-band (LB) radiating elements. In that case, low-band radiating elements may be designed to minimize the footprint of the low-band radiating element structure. For example, 4 thin printed circuit boards (PCBs) are used to fit the reduced dimensions available between 5G radiating elements. The LB radiating element can fit in the small available space if seen from the "top view," but a large number of associated feeding structures on the back of such an antenna panel may lead to a very complicated array-feeding layer.

As such, a radiating element where a radiating location is separated from a feeding location is further provided. In the top view of the chassis, the locations of the radiating element is not aligned with its fixation location, which can be seen from FIGS. 2A, 2B, 2D, 2E, 2F, 2G and 2H.

Figure 2A:
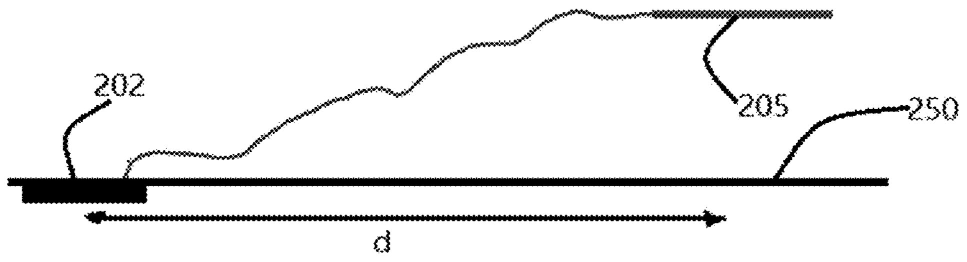
FIGS. 2A through 2H, 3A through 3C, 4, 5A through 5C and 6 illustrate an example of an antenna system or components thereof according to embodiments where a cantilever-type supporting element is used.

Referring to FIG. 2A, according to some embodiments of the present disclosure, there is provided a radiating element 205 (also referred to as a first antenna element 205) where its radiating location is separated from its feeding location. As shown therein, a distance between the position where the radiating element 205 is located (i.e., a radiating location, which is also referred to as "radiating area" herein) and its feeding location (i.e., a mechanical fixation location, which is also referred to as "mechanical fixation area") in lateral or longitudinal to the chassis 250 is not theoretically limited; the distance d between the radiation area and the mechanical fixation area in lateral or longitudinal to the chassis 250 may be a few millimeters, a few centimeters, a few meters, tens of meters, hundreds of meters, thousands of meters, or even further. For example, $d=(N+M/4)\lambda$, where $\lambda$ is a first wavelength corresponding to the operating frequency of the radiating element 205, N is a natural number (e.g. N=0, 1, 2 . . . ), and M is an integer ranging from 1 to 3 (i.e., M is 1 or 2 or 3). Specifically, the distance d between the radiation area and the mechanical fixation area in lateral or longitudinal to the chassis 250 is ¼, ½, 1 or 2 times of the wavelength of the signal sent or received by the radiating element 205.

Figure 2B:
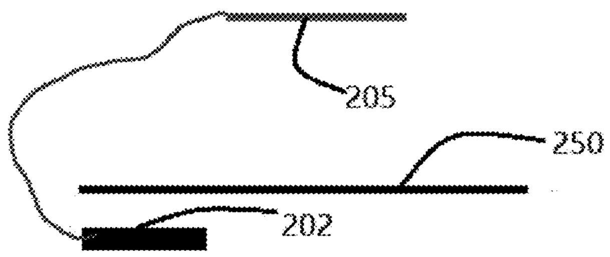

Referring to FIG. 2B, according to some embodiments of the present disclosure, the feeding location (i.e., the mechanical fixation location) may be at a certain distance away from the radiating element 205 on the side of the chassis 250 facing away from the radiating element 205.

Figure 2C:
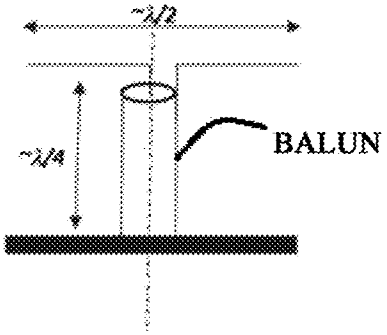

FIG. 2C illustrates a dipole antenna element according to the present disclosure. As shown therein, the distance perpendicular to the chassis between the dipole antenna element and the chassis is ¼ of the wavelength of the signal sent or received by the dipole antenna element, and the radiation area of the dipole antenna element and its mechanical fixation area overlap.

Figure 2D:
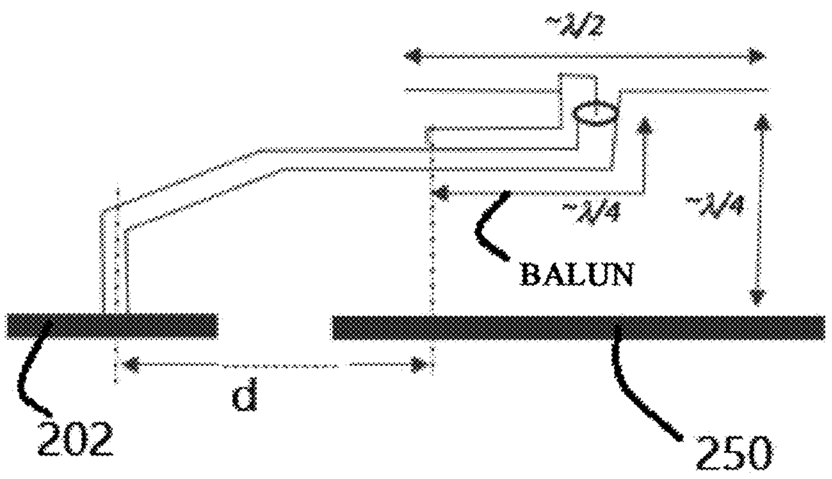

FIG. 2D illustrates a dipole antenna element according to the present disclosure. As shown therein, the distance perpendicular to the chassis between the dipole antenna element and the chassis is ¼ of the wavelength of the signal sent or received by the dipole antenna element, but the radiating area of the dipole antenna element and its mechanical fixation area are not aligned with each other (i.e., do not overlap). As shown in FIG. 2D, the distance between the radiation position and its feeding location (i.e., the mechanical fixation location) in lateral or longitudinal to the chassis 250 is not theoretically limited. The distance d between the radiation area and the mechanical fixation area in lateral or longitudinal to the chassis 250 may be a few millimeters, a few centimeters, a few meters, tens of meters, hundreds of meters, thousands of meters, or even further. For example, $d=(N+M/4)\lambda$, where $\lambda$ is a first wavelength corresponding to the operating frequency of the radiating element 205, N is a natural number (e.g. N=0, 1, 2 . . . ), and M is an integer ranging from 1 to 3 (i.e., M is 1 or 2 or 3), which has been described in connection with FIG. 2A. Specifically, the distance d between the radiation area and the mechanical fixation area in lateral or longitudinal to the chassis 250 is ¼, ½, 1 or 2 times of the wavelength of the signal sent or received by the radiating element 205.

Figure 2E:
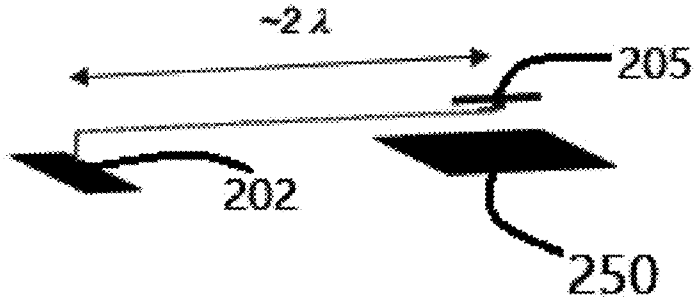

FIG. 2E is a further illustration of FIG. 2D. As shown therein, in some embodiments of the present disclosure, the radiating element 205 is a dipole antenna element, where its radiation position is separated from its mechanical fixation location 202 (also referred to as a first chassis 202 or a first mechanical structure 202), and the mechanical fixation location 202 is not connected to the chassis 250. As shown in FIG. 2E, the mechanical fixation location 202 and the chassis 250 are not connected. As described above with reference to FIGS. 2A and 2D, the distance between the radiation position (i.e., the position where the radiating element 205 is located) and the mechanical fixation location 202 in lateral to the chassis 250 is not theoretically limited. That is, the distance may be infinite in theory, which may be, for example, a few millimeters, a few centimeters, a few meters, tens of meters, hundreds of meters, thousands of meters, or even greater.

Figure 2F:
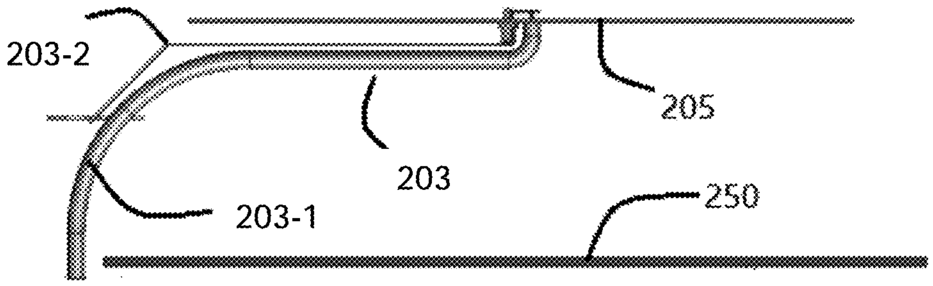

FIG. 2F is a front view of the radiating element 205, the cantilever-type supporting element 203, and the chassis 250 according to the present disclosure. As shown therein, in some embodiments of the present disclosure, the cantilever-type supporting element 203 comprises power distribution means 203-1 arranged in the cantilever-type supporting element for distributing power to and delivering power from the radiating element 205. Additionally or alternatively, the power distribution means 203-1 comprises one or more pairs of coaxial cables, where one or more pairs of corresponding baluns 203-2 are mechanically connected to the power distribution means 203-1. In some embodiments, an extension of the balun may form an angle of (+/−) 45° with respect to the plane defined by the radiating element 205.

Figure 2G:
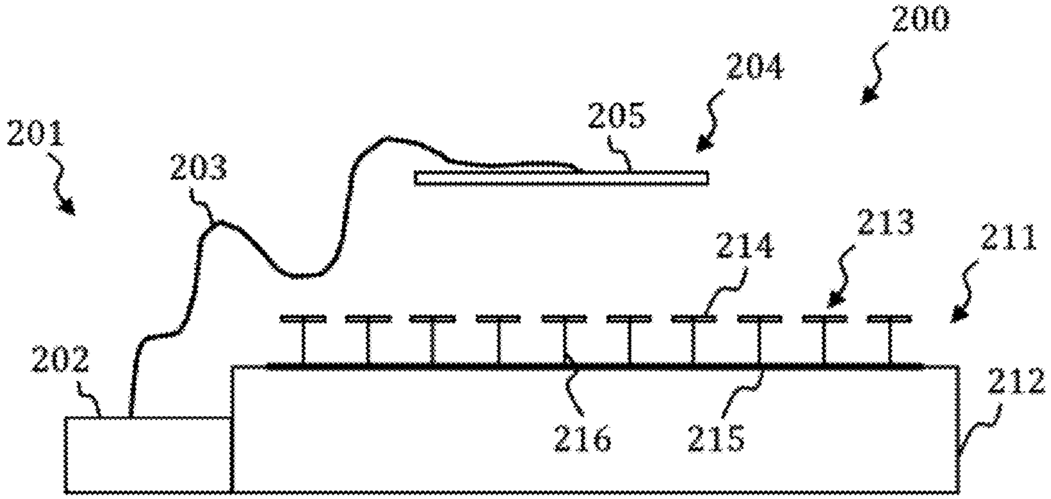
Figure 2H:
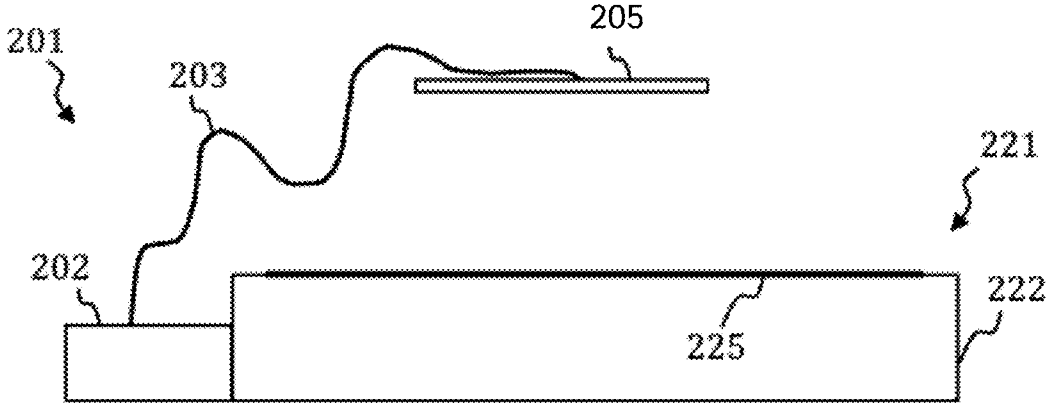

FIGS. 2G and 2H provide a schematic illustration of the basic inventive concept according to embodiments. Specifically, FIG. 2G illustrates a simplified antenna system 200 according to an exemplary embodiment in a side view while FIG. 2H illustrates an antenna module of the antenna system 200 in a side view in use without another antenna module of the antenna system 200 (i.e., the antenna system 200 includes only a first antenna module 201 which is used in a "stand-alone mode"). It should be noted that FIGS. 2G and 2H show a very simplified view where many of the elements of the antenna system 200 (e.g., any power distribution elements, a radio unit and radomes) have been omitted.

Referring to FIGS. 2G, the antenna system 200 comprises a first antenna module 201 and a second antenna module 211. In an embodiment, the first antenna module 201 comprises passive elements while the second antenna module 211 additionally comprises one or more active elements (i.e., active circuitry). The first antenna module 201 comprises a first antenna array 204 of which a single first antenna element 205 is shown in FIG. 2G. One or more further first antenna elements may be provided adjacent to the first antenna element 205 in a direction orthogonal to the plane illustrated in FIG. 2G and/or arranged on an opposite side of the second antenna module 211, optionally in symmetric manner with the first antenna element 205, as shown in some of the following, more detailed Figures. The second antenna module 211 comprises a second antenna array 213 comprising a plurality of second antenna elements 214. Similar to as described above, the second antenna array 213 may be a (5G) active massive MIMO antenna array and the first antenna array 204 may be a (4G or lower) passive antenna array (or even just a singular antenna). In general, the first antenna array 204 may be adapted to operate at a first frequency band while the second antenna array 213 may be adapted to operate at a second frequency band higher than the first frequency band. The first frequency band may be a radio frequency band, e.g., within the super high frequency (SHF) band and/or the ultra high frequency (UHF) band and the second frequency band may be a radio frequency band, e.g., within the extremely high frequency (UHF) band and/or any higher frequency band. In some embodiments, the center frequency of the second frequency band may be equal to or larger than two, three or four times of the center frequency of the first frequency band. For example, the first antenna array 204 may be adapted to operate at 694-960 MHz frequency band, while the second antenna array 213 may be adapted to operate at 3.3-3.8 GHz frequency band or at 3.3-4.2 GHz frequency band.

To reduce the overall width of the antenna system 200, the first antenna array 204 (or at least the first antenna element 205 thereof) is arranged over the second antenna array 213 of the second antenna module 211 via a cantilever-type supporting element 203 extending over the second antenna module 211, instead of being, e.g., adjacent to it which would lead to a wider overall antenna system 200. The cantilever-type supporting element 203 may be defined as a rigid structural element that extends, at least in part, horizontally (from left to right in FIG. 2G) and is supported at only one of its two ends (here called the second end). The cantilever-type supporting element 203 may be made, for example, of (molded) metal.

The cantilever-type supporting element 203 may have a curved and/or bent shape so that the arranging of the first antenna array 204 over the second antenna module 211 is enabled, as shown in FIG. 2G. Namely, the cantilever-type supporting element 203 may be curved and/or bent predominantly towards the second antenna module 211. Alternatively, the cantilever-type supporting element 203 may be substantially straight but oriented so as to form a non-right angle with the plane of the second antenna module 211 (or of the second antenna array 213 thereof) or of a first chassis 202 of the first antenna module 201.

A first (i.e., non-supported) end of the cantilever-type supporting element 203 is attached to the first antenna element 205 while the second end of the cantilever-type supporting element 203 is attached to a first mechanical structure 202 of the first antenna module 201. The first mechanical structure 202 may, for example, be or form a part of the chassis or frame of the first antenna module 201. The first mechanical structure 202 may, in practice, surround the first antenna module 201, fully or partly, such that an opening or a cavity is provided in the first mechanical structure 202 for receiving the second antenna module 211, as will described in detail in connection with further embodiments below. Specifically, an elongated opening or cavity extending along a longitudinal direction of the first mechanical structure 202 (e.g., a first chassis) may be provided (the longitudinal direction being a direction pointing into FIG. 2G). The first mechanical structure 202 may be detachably attachable or mountable onto a second mechanical structure 212 (e.g., a second chassis or frame) of the second antenna module 211. As described above, the first and second antenna modules 201, 211 may be only mechanically, not electrically, connected for facilitating the replacing of the first or second antenna module 201, 211. In FIG. 2G, the radiation position of the first antenna element 205 is also separated from the feeding location of the cantilever-type supporting element 203 (i.e., the first mechanical structure 202, i.e., the mechanical fixation location). In addition, as shown in FIG. 2G, the first antenna element 205 is connected to the chassis via the feeding location of the cantilever-type supporting element 203 (i.e., the mechanical fixation location 202).

First power distribution (or feeding) means may be at least partially integrated or attached onto or into the cantilever-type supporting element 203 for distributing power to and delivering power from the first antenna array 204. For example, the first power distribution means may comprise a pair of coaxial cables travelling along the length of the cantilever-type supporting element 203 for feeding the first antenna array 204 (e.g., a crossed-dipole type antenna element). The first power distribution means may provide one or more input/output ports. The first power distribution means may also comprise one or more phase shifters forming a first phase shifter network for enabling beamforming for the first antenna array 204. In some embodiments, the first antenna module 201 may also comprise other circuitry.

In some embodiments, the first antenna module 201 may comprise a balun integrated into the power distributions means or forming a part thereof. A balun is an electrical device which converts balanced signals to unbalanced signals and vice versa. Specifically, a balun may be used here for converting an unbalanced signal of a coaxial cable to a balanced signal to be fed to the first antenna element 205 (e.g., a crossed-dipole-type antenna) in transmission and providing opposite operation in reception. The balun may be, for example, a sleeve balun configured to operate at the first frequency band (or at least configured to operate optimally at a frequency within the first frequency band).

The first antenna array 204 may be specifically a one- or two-dimensional planar array with uniform antenna spacing. The first antenna element(s) 205 of the first antenna array 204 may have the same geometry and dimensions. Said first antenna element(s) 205 may be any conventional resonant antenna elements used in antenna arrays such as patch or crossed-dipole antennas of any known design. Preferably, the first antenna element(s) 205 should be designed such that the antenna blockage caused by them to the second antenna array 213 is minimized. This may be achieved, in general, by minimizing the metallic or metallized (or in general electrically conductive) surface area of the first antenna element(s) 205. Therefore, cross-dipole-type antenna designs may be considered preferable over patch-type antenna designs, for example. The first antenna element(s) 205 may be, for example, microstrip antennas (without a ground plane), i.e., printed circuit board (PCB)-based printed antennas, or antennas formed of separate (thin) metal sheets. Said first antenna element(s) 205 may be specifically omnidirectional and/or dual-polarized antenna elements. A few exemplary antenna designs are discussed in connection with further, more detailed embodiments below. The first antenna element(s) 205 may be made, at least partially, of a metal or an alloy.

The electrically conductive (e.g., metallic) ground plane 215 of the second antenna array 213 may act as a ground plane also for the first antenna array 204 (i.e., at least for the first antenna element 205). To enable this, the first antenna array 204 may be arranged substantially at a distance of $\lambda/4$ from a ground plane 215 of the second antenna array 213 (which, thus, acts also as the ground plane for the first antenna array 204), where k is a first wavelength being a wavelength associated with the first frequency band (i.e., a wavelength corresponding to a frequency in said first frequency band). With such an arrangement, the electromagnetic waves radiated, by the first antenna array 204, orthogonally to the plane of the first antenna array 204 and away from the second antenna array 213 interfere constructively with the electromagnetic waves radiated to the opposite direction and subsequently reflected from the ground plane 215 causing an increase in antenna performance (e.g., in antenna gain). In practice, specifically the cantilever-type supporting element 203 may be adapted (i.e., shaped) so as to satisfy this condition for the arrangement of the first antenna array 204.

The second antenna array 213 may be specifically a one- or two-dimensional planar array with uniform antenna spacing. The plurality of second antenna elements 214 of the second antenna array 213 may be arranged over the (planar) ground plane 215 which acts as a ground plane also for the first antenna array 204 (i.e., at least for the first antenna element 205), as mentioned above. The plurality of second antenna elements 214 may be separated from the ground plane 215 by free space (i.e., air) or by a substrate (on which the plurality of second antenna elements 214 may be printed and other side of which may be metallized to form the ground plane 215). The plurality of second antenna elements 214 may be fed by feeding elements 216 which may form a part of second power distribution means of the second antenna module 211 (other elements being, e.g., inside element 213) for enabling beamforming for the second antenna array 213. Each feeding element 216 may correspond, for example, to one or more coaxial cables or other transmission lines for feeding a corresponding second antenna element 214 at one or more feed points (with the outer conductor of the coaxial cable being connected to the ground 215) or one or more pairs of feed points. The ground plane 215 may be mounted on the second mechanical structure 212 of the second antenna module 211.

All of the plurality of second antenna elements 214 have the same geometry and dimensions. Said plurality of second antenna elements 214 may be any conventional resonant antenna elements used in (5G) antenna arrays such as patch or crossed-dipole antennas of any known design. Said plurality of second antenna elements 214 may be microstrip antennas, i.e., printed circuit board (PCB)-based printed antennas, or antennas formed of separate (thin) metal sheets. Said plurality of second antenna elements 214 may be specifically omnidirectional and/or dual-polarized antenna elements. The plurality of second antenna elements 214 may be assumed to be considerably smaller (or specifically electrically smaller) than any operational wavelength of the first antenna array 204 so that the plurality of second antenna elements 214 are capable of interacting only weakly with any electromagnetic waves transmitted by the first antenna array 204 or receivable via the first antenna array 204. The second antenna elements may be made, at least partially, of a metal or an alloy.

While not shown in FIG. 2G, the second antenna module 211 may comprise a radio unit operatively coupled to the second antenna array 213 for radio reception and/or transmission via the second antenna array and/or other at least partially active circuitry. Said radio unit may be a radio receiver, transmitter or transceiver. As mentioned above, the second antenna module 211 also comprises second power distribution means for distributing power to and from the plurality of second antenna elements 214 of the second antenna array 213. The second power distribution means may provide one or more input/output ports.

In some embodiments, a first parasitic (electrically conductive) element arranged substantially on top of each first antenna element 205 (and separated from it by a certain distance) may be used for increasing the operational bandwidth of the first antenna array 204 and/or improving impedance matching and/or tuning the radiation pattern characteristics. Additionally or alternatively, a plurality of second parasitic (metallic) elements arranged substantially on top of the plurality of second antenna elements 214 (and separated from them by a certain distance) may be used for increasing the operational bandwidth of the second antenna array 213 and/or improving impedance matching and/or tuning the radiation pattern characteristics. The first and/or second parasitic element may be arranged along a plane which is parallel to a plane of the first and/or second antenna array 204, 213, respectively. Each first and/or second parasitic element may be separated from the corresponding antenna element by one or more supporting elements. Each first and/or second parasitic element may be made, at least partially, of a metal or an alloy. In some embodiments, each first and/or second parasitic element may be implemented on a PCB.

As mentioned above, the first antenna module 201 may be removed from the antenna system 200 so that the second antenna module 211 is used solely without the first antenna module 201, and the second antenna module 211 may be removed from the antenna system 200 so that the first antenna module 201 is used solely without the second antenna module 211. While the second antenna module 211 may be used as such without the first antenna module 201, the first antenna module 201 needs to be provided with a separate ground plane element if the second antenna module 211 is not used as a ground plane. This property is illustrated in FIG. 2H, where the second antenna module 211 has been removed from the antenna system 200 and replaced with a module 221 corresponding to a bare ground plane 225 on a mechanical structure 222 without any antennas. As the first antenna array 204 employs the ground plane of the second antenna module 211 as its own ground plane in FIG. 2G, such a separate "ground plane module" as module 221 is needed to maintain the earlier operation of the first antenna module 201 (that is, in order not to significantly alter the radiation pattern and/or impedance matching of the first antenna array 204).

Figure 3A:
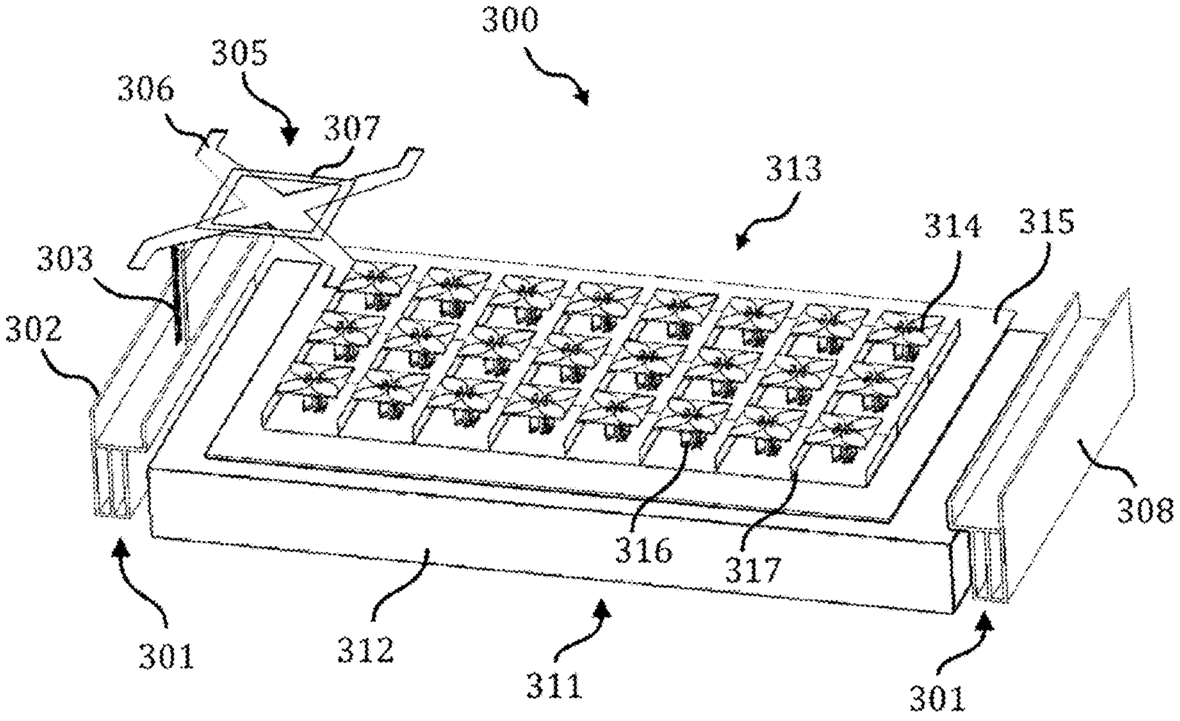
Figure 3B:
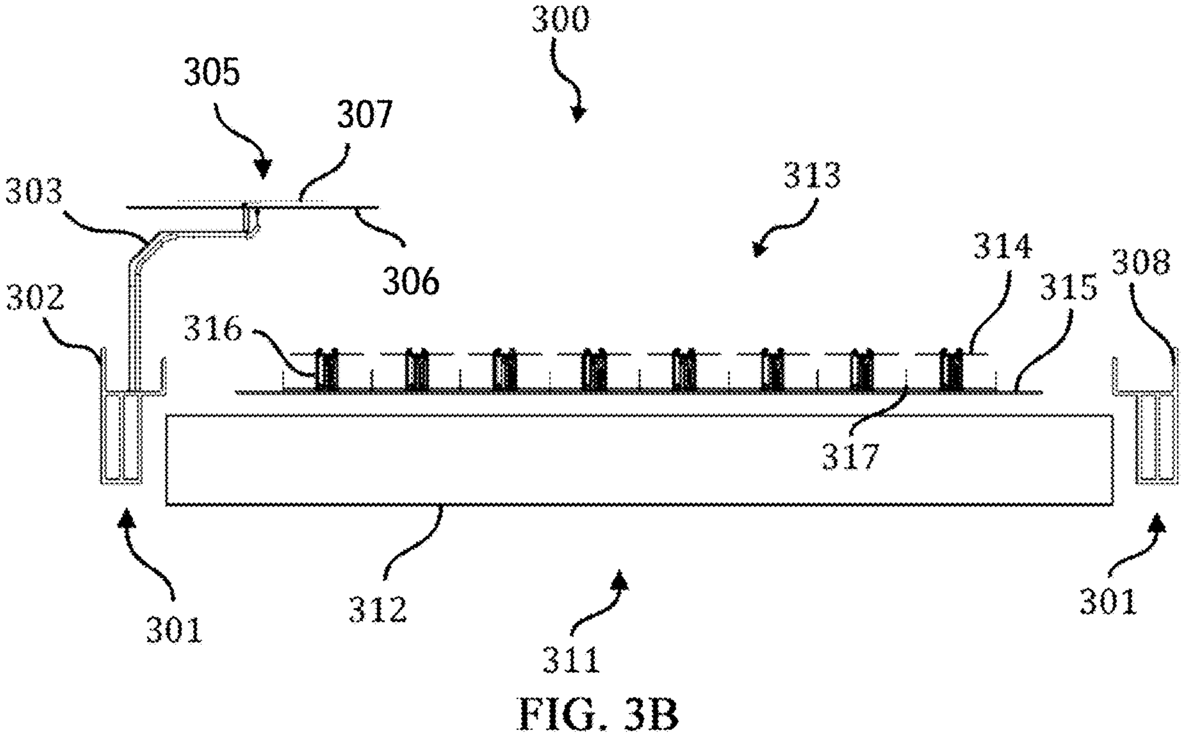
Figure 3C:
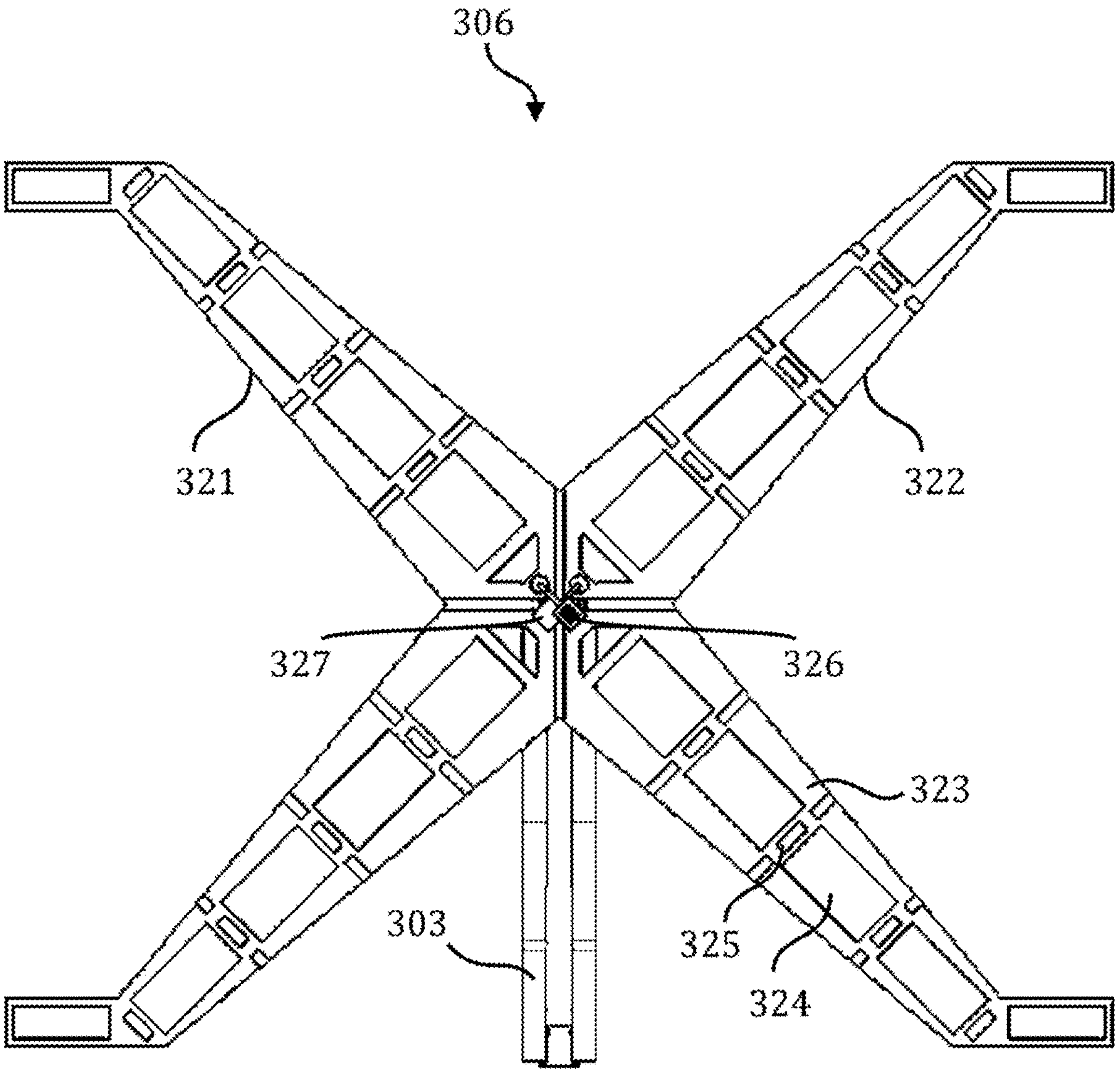

FIGS. 3A, 3B and 3C illustrate, in a more detailed view compared to FIG. 2G, an antenna system 300 according to embodiments. Specifically, FIGS. 3A and 3B illustrate the antenna system 300 according to an exemplary embodiment in a perspective view and a side view, respectively, while FIG. 3C provides a more detailed view of a first antenna element 305 of the first antenna module 301.

It should be noted that FIGS. 3A, 3B and 3C are somewhat simplified compared to an actual physical antenna system 300 as, for example, some mechanical and power distribution elements as well as any radio unit or any radomes have been omitted. As discussed in connection with FIGS. 2G and 2H, the first and second antenna module 301, 311 are assumed to be detachably connectable also here. FIGS. 3A and 3B may illustrate only a single section of the full antenna system 300 comprising a plurality of such illustrated sections arranged in series.

The elements 301-303, 305, 311-316 of FIGS. 3A, 3B and 3C may correspond, mutatis mutandis, to elements 201-203, 205, 211-216 of FIG. 2G as described above, unless otherwise explicitly stated.

Referring to FIGS. 3A, 3B and 3C, the antenna system 300 comprises, as in above embodiments, a first antenna module 301 and a second antenna module 311. The first antenna module 301 comprises a first antenna array of which a single first antenna element 305 is shown in FIGS. 2G and 2H. One or more further first antenna elements may be provided adjacent to the first antenna element 305 in a direction orthogonal to a plane of FIG. 3B and/or arranged on an opposite side of the second antenna module 311 attached to a third mechanical structure 308, in a similar manner as shown for the first antenna element 305 and the first mechanical structure 302. It should be noted that the first and third mechanical structure 302, 308 may be mechanically connected and form a part of the same first chassis of the first antenna module 301.

The second antenna module 311 comprises a second antenna array 313 comprising a plurality of second antenna elements 314 arranged above a ground plane 315, similar to as described in connection with FIG. 2G. Specifically, a 3×8 array is illustrated in FIGS. 3A and 3B. It should be noted that, in this particular embodiment, there is provided a set of vertical metal walls 317 extending orthogonally from the ground plane 315 of the second antenna array 313 for better isolating the individual second antenna elements 314 of the second antenna array 313 from each other. In other embodiments, such elements may be omitted.

In this particular exemplary embodiment, both the first and second antenna elements 305, 314 are crossed dipole-type antenna elements (though of different designs). In general, a crossed dipole antenna may comprise two dipole antenna elements (elements 321, 322 for the first antenna element 305) having identical dimensions mounted substantially at right angles relative to each other. Any antenna element having a (directivity) radiation pattern of a dipole antenna (i.e., a radiation pattern having a toroidal or "donut" shape) may be considered here a dipole antenna element. Each of the two dipole antenna elements has two arms between which the dipole antenna element may be fed. As is evident from the differing geometry of first and second antenna elements 305, 314, the dipole antenna elements of the crossed dipole-type antenna element may have a variety of different shapes depending on, e.g., the bandwidth and radiation pattern requirements. In the illustrated example, individual arms of the dipole antenna elements of the first and second antenna elements 305, 314 are shaped like an elongated tapering strip bent at the distal end and like a lens, respectively. In general, the individual arms of the dipole antenna elements of the first and second antenna elements 305, 314 may, for example, have a shape of any polygon with optionally one or more slots.

The two dipole antenna elements of the first and second antenna elements 305, 314 may be specifically half-wave dipole antenna elements (i.e., they may exhibit half-wave resonance at a corresponding operational frequency of the antenna system 300). The first and second antenna elements 305, 314 may, for example, be separate metallic sheets or be metallized surfaces printed on a (thin) substrate.

The two dipole antenna elements of either of the first and second antenna elements 305, 314 may be fed in phase quadrature, that is, the two currents applied to the dipole antenna elements by two feedlines (pairs of feeding points for connecting the two feedlines being illustrated here with elements 326, 327 for the first antenna element 305) may be 90° out of phase with each other. In practice, with coaxial feedlines, the outer conductor may be connected to a proximate end of one arm of the dipole and the inner conductor of the coaxial feedline may be connected to a proximate end of the opposite arm of the same dipole. A crossed dipole antenna with the aforementioned feeding arrangement may provide close to omnidirectional radiation pattern with dual polarization behavior.

In some embodiments, the two dipole antenna elements of either of the first and second antenna elements 305, 314 may be fed in-phase (with no phase shift relative to each other) resulting in circular polarization, instead of linear polarization as in the embodiment described in the previous paragraph.

As shown in FIGS. 3A and 3B, the first antenna element 305 comprises a first crossed dipole antenna element 306 and a parasitic metallic element 307 in the shape of a rectangular frame arranged over the first crossed dipole antenna element 306. The parasitic metallic element 307 is concentric with the first crossed dipole antenna element 306. In some embodiments, said parasitic metallic element 307 may be omitted or may have a different shape (e.g., a cross-shape).

Referring specifically to FIG. 3C showing a more detailed view of the first crossed dipole antenna element 306, the first crossed dipole antenna element 306 is implemented as a set of metallic sheets or metallized surfaces 323 of a printed circuit board (PCB) forming the four dipole arms of the two crossed dipole antennas 321, 322. Each of the four dipole arms of the first crossed dipole antenna element 306 has the shape of a strip tapering towards its distal end and having a bend at its distal end, as mentioned above. The first crossed dipole antenna element 306 comprises a plurality of longitudinal slots 324 and a plurality of transverse slots 325 arranged along the arms of the first crossed dipole antenna element 306. Such slots 324, 325 serve to minimize the antenna blockage caused by the first crossed dipole antenna element on the second antenna array 313. They also have an effect on various properties of the first crossed dipole antenna element 306 such as input impedance. In general, the first antenna element of the first antenna array as used in embodiments may be implemented as a metallic sheet or a metallized surface of a PCB comprising one or more slots (equally called apertures or slits).

Figure 4:
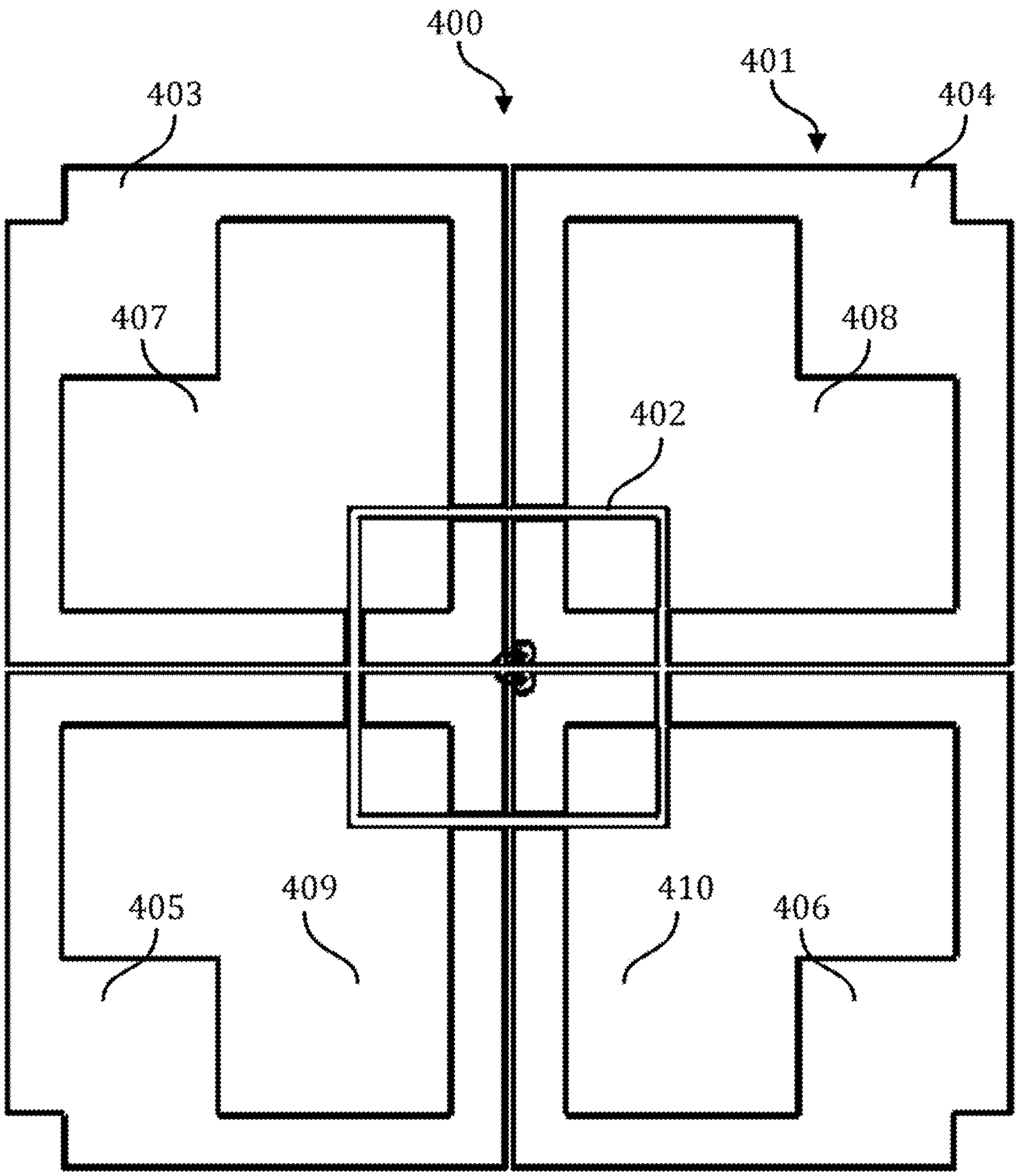

FIG. 4 shows another alternative design for the first antenna element 400 of the first antenna array of the passive antenna module according to embodiments. The first antenna element 400 of FIG. 4 comprises a crossed dipole antenna element 401 and a metallic parasitic element 402 arranged on top of the crossed dipole antenna element 401 in the shape of a rectangular frame (similar to the embodiment of FIGS. 3A, 3B and 3C). The crossed dipole antenna element 401 may be printed on a substrate (i.e., it may be PCB-based) or be a separate metal sheet. Each dipole arm 403, 404, 405, 406 of the crossed dipole antenna element 401 has a shape of a square with a notch on the outermost corner and comprising a symmetrical 'L'-shaped slot 407, 408, 409, 410 pointing towards the center of the crossed dipole antenna element 401. Each dipole arm 403, 404, 405, 406 of the crossed dipole antenna element 401 is fed from a corner opposite to said corner with a notch according to common practices for feeding a crossed dipole antenna.

Figure 5A:
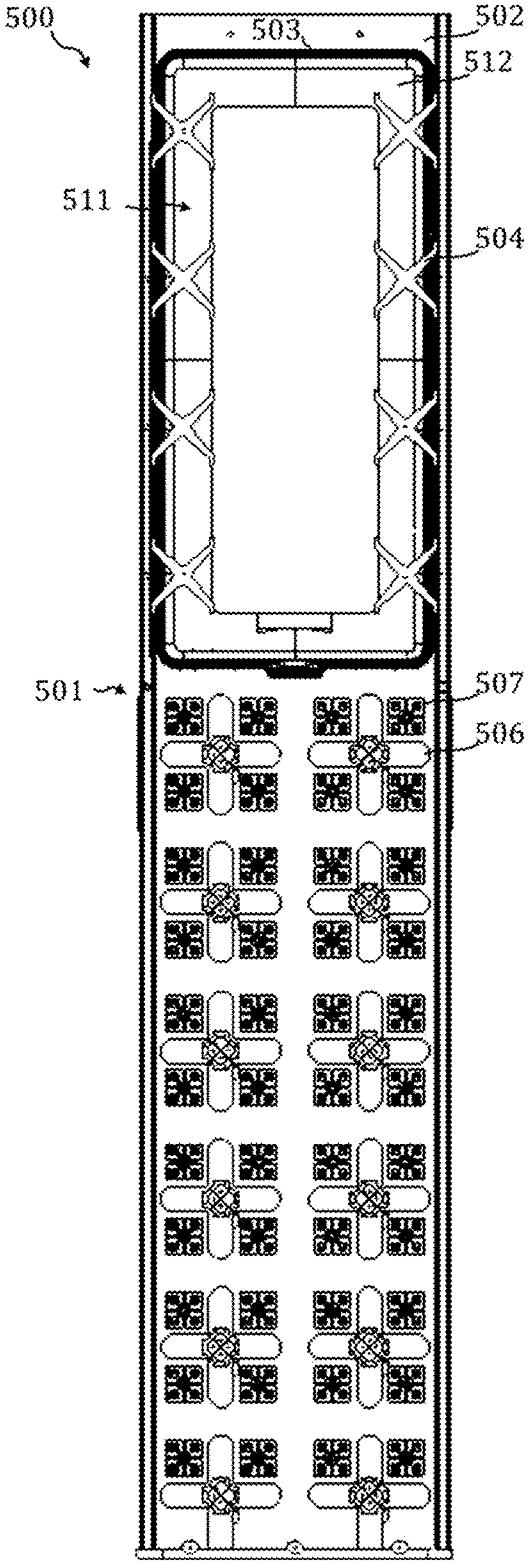
Figure 5B:
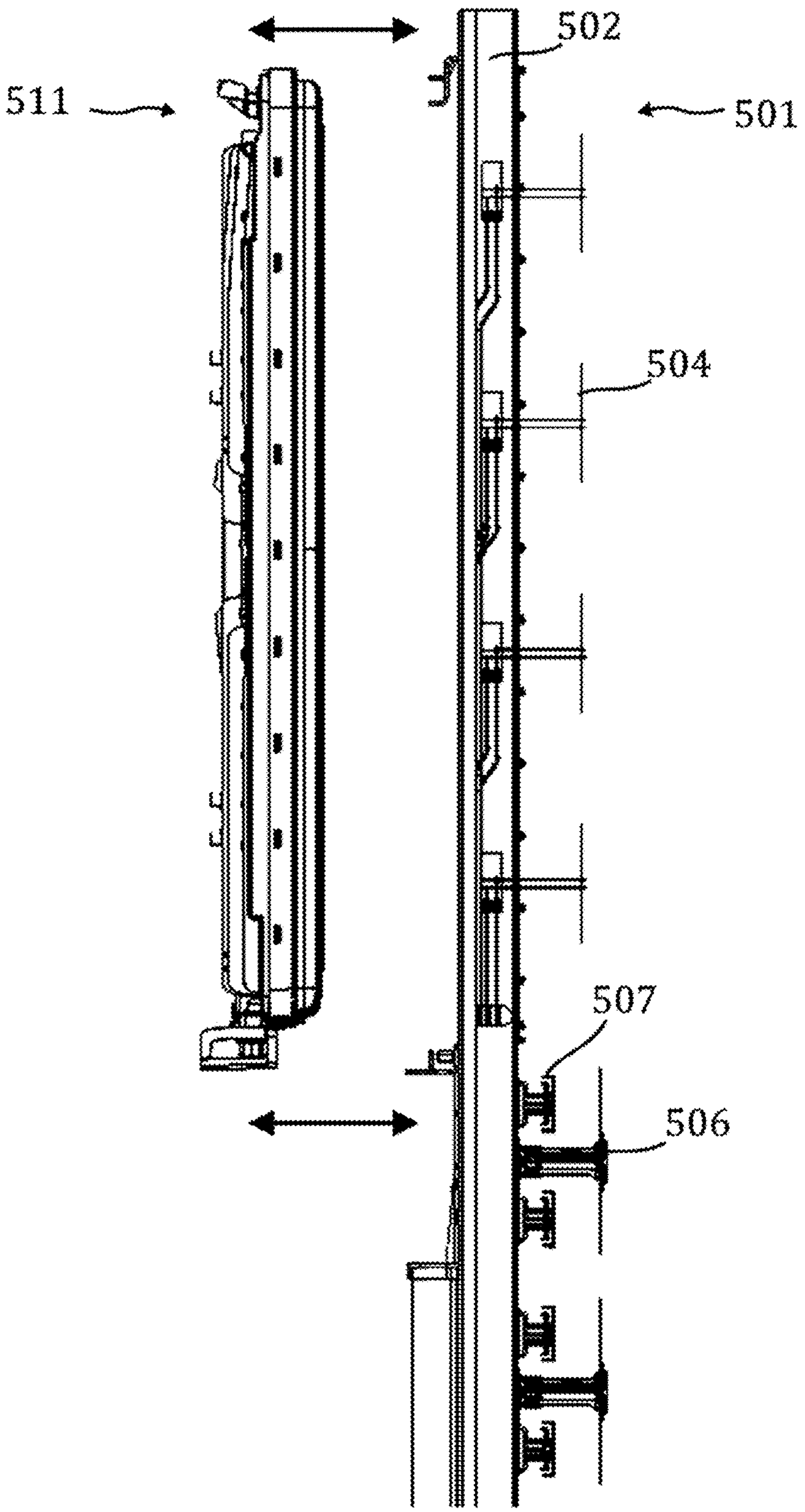
Figure 5C:
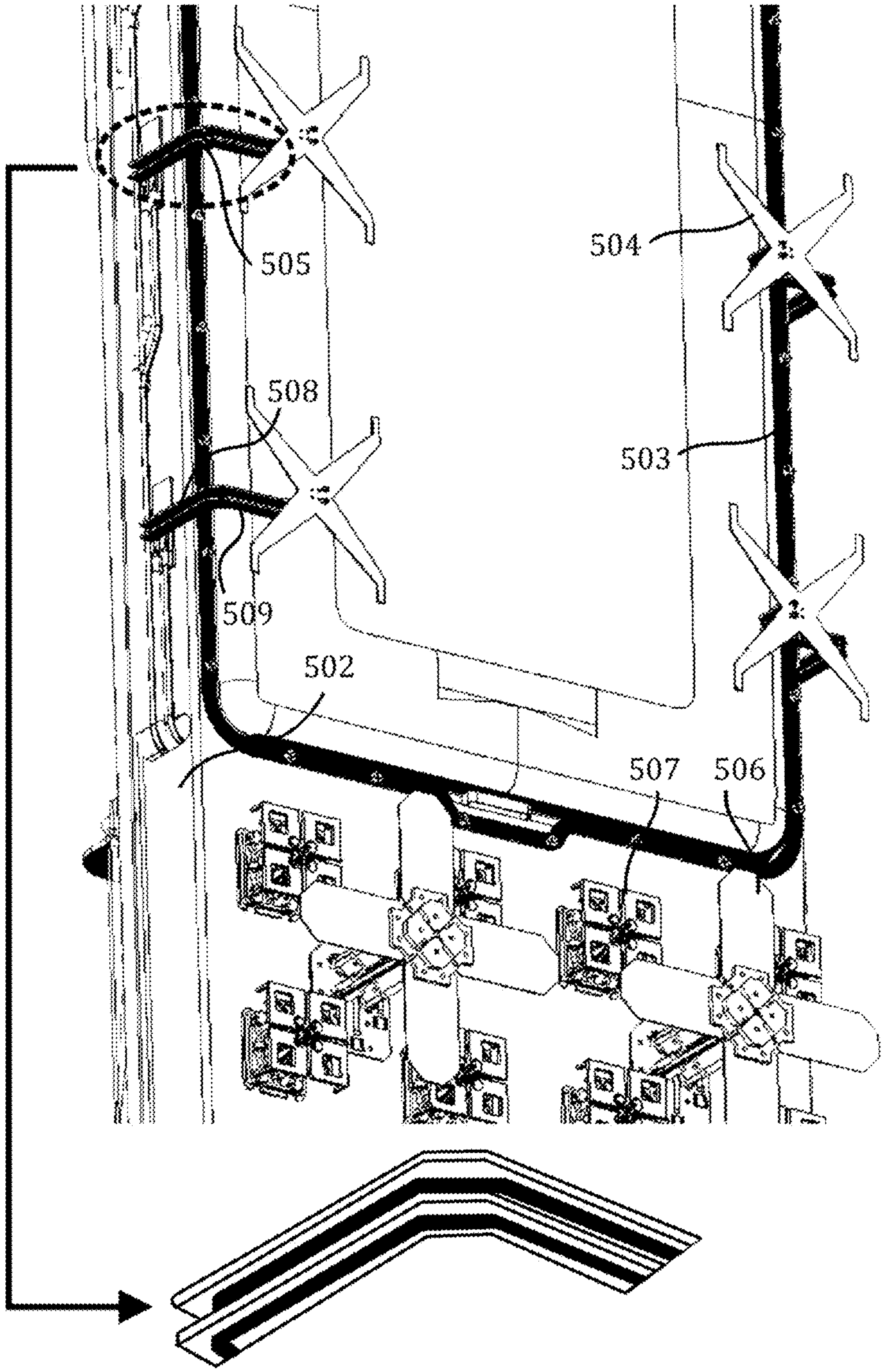

FIGS. 5A, 5B and 5C illustrate, in yet more detailed view compared to FIGS. 3A, 3B and 3C, an antenna system 500 according to embodiments. Specifically, FIGS. 5A, 5B and 5C illustrate the antenna system 500 according to an exemplary embodiment from above, partially from the side and partially in a perspective view, respectively. As in above embodiments, the antenna system 500 comprises a first antenna module 501 and a second antenna module 511. The first antenna module 501 (or specifically the first chassis 502) and the second antenna module 511 may have an elongated shape as shown in FIGS. 5A, 5B and 5C (being both elongated along the same direction). Notably, in FIG. 5B, the first and second antenna modules 501, 511 are shown detached from each other while FIGS. 5A and 5C show them when they are attached to each other. In general, the antenna system 500 may correspond to the antenna system of FIG. 2G and/or antenna system 300 of FIGS. 3A, 3B and 3C. While FIGS. 3A and 3B omitted some (electromagnetically insignificant) structural features of the antenna system, FIGS. 5A, 5B and 5C illustrate the antenna system 500 in full.

Referring to FIGS. 5A, 5B and 5C, the first antenna module 501 comprises a first chassis (or frame) 502 which is suitable for detachably mounting (or detachably attaching) onto a second antenna module 511 of the antenna system 500. The first chassis 502 comprises an opening 503 extending over the second antenna module 511 when the first chassis 502 is mounted onto the second antenna module 511 for minimizing antenna blockage caused by the first antenna module 501 (predominantly by the first chassis 502 thereof). The arrows in FIG. 5B indicate the mounting direction. As shown in FIGS. 5A, 5B and 5C, both the first chassis 502 and the opening 503 may have a shape which is elongated along the same direction. The opening 503 may extend specifically at least partially over a second antenna array of the second antenna module 511 when the first chassis 502 is mounted onto the second antenna module 511. The opening 503 may be, for example, a rectangular opening as depicted in FIGS. 5A, 5B and 5C. Once mounted, the first chassis 502 of the first antenna module 501 is adapted to surround the second antenna module 511. In other words, the second antenna module 511 is embedded into the first chassis 502 of the first antenna module 501. The first chassis 502 may be, for example, made of a metal or an alloy, at least for the most part.

Figure 9A:
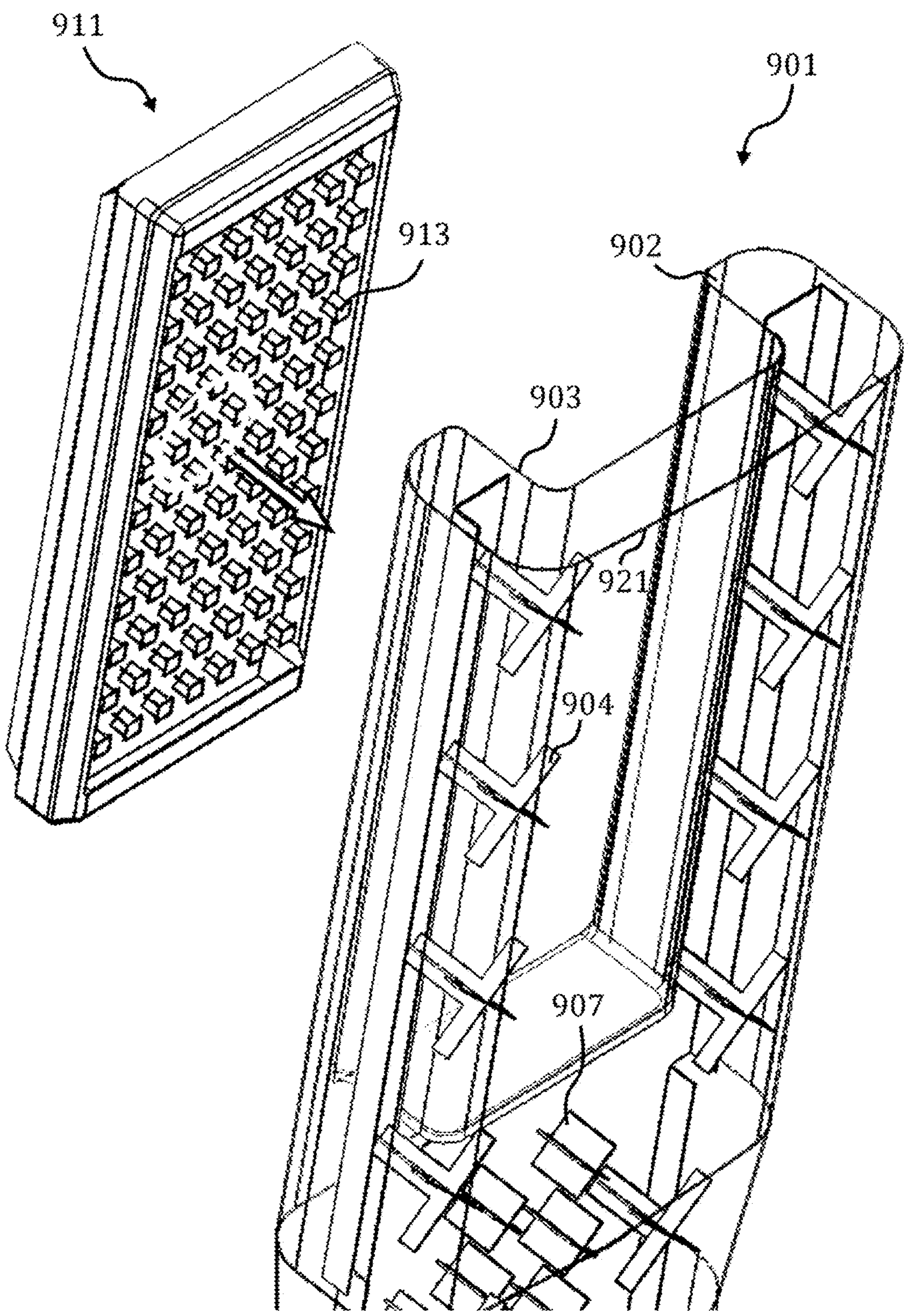
Figure 9B:
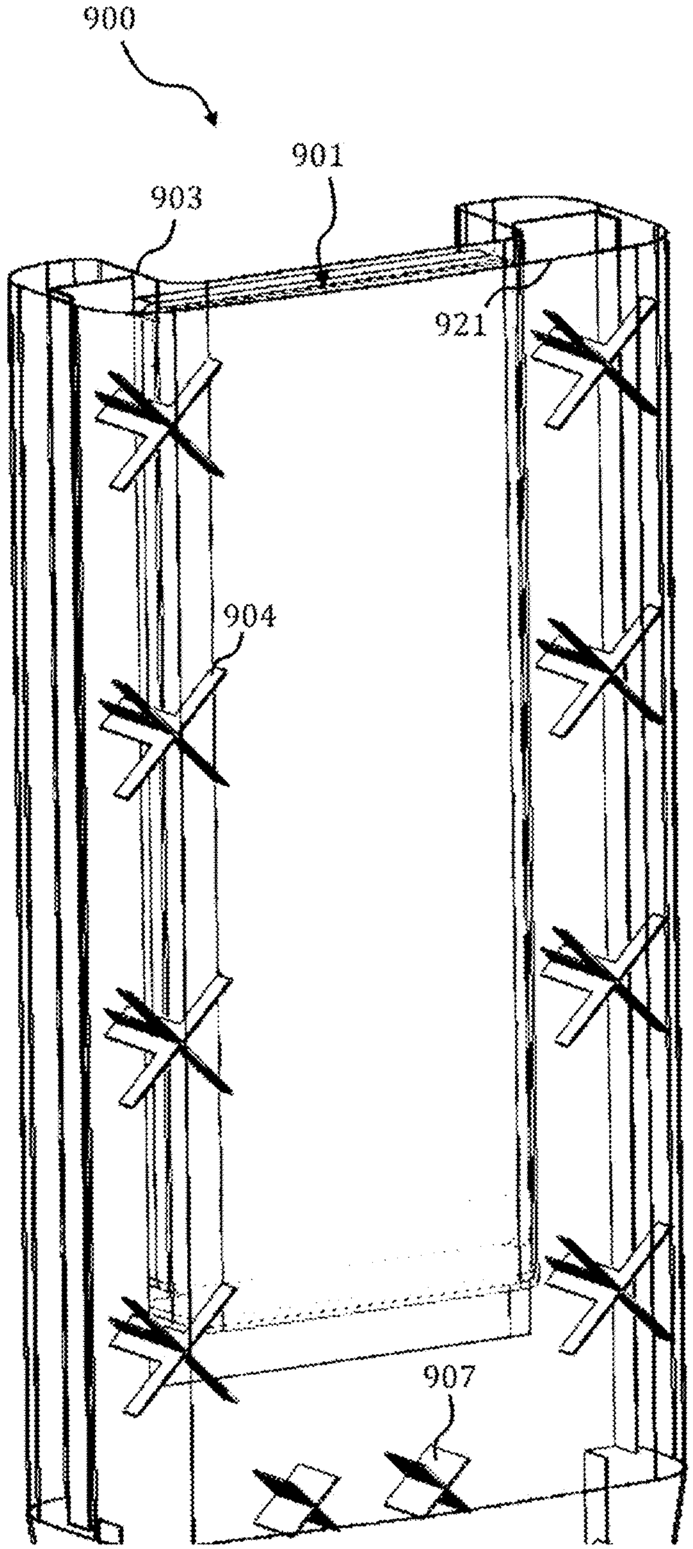

In some alternative embodiments, a (rectangular) cavity or hollow may be provided in the first chassis 502, instead of the opening 503, for enabling the same functionality as described for the opening 503. For example, such a cavity or a hollow may be implemented by removing at least one of the walls of the opening 503 (e.g., the wall shown on top of FIG. 5A). The cavity may specifically penetrate through the first chassis 502 in a direction orthogonal to a plane of the first chassis 502 (or equally orthogonal to the plane of the first antenna array 504). The cavity may have an elongated shape. One example of such a cavity is shown in FIGS. 9A and 9B in connection with another embodiment.

The first antenna module 501 further comprises a plurality of cantilever-type supporting elements 505 mechanically connected, at one or more second ends of the plurality of cantilever-type supporting elements 505, to the first chassis 502. Said plurality of cantilever-type supporting elements 505 are adapted to extend (inwardly) over the opening 503 of the first chassis 502. Said plurality of cantilever-type supporting elements 505 may be adapted to extend substantially towards a central (longitudinal) axis of the first chassis 502. At least the first ends of the plurality of cantilever-type supporting elements 505 may be arranged over the opening 503. Specifically, the plurality of cantilever-type supporting elements 505 may be mechanically connected to part(s) of the first chassis 502 adjacent to the opening 503. Specifically, the plurality of cantilever-type supporting elements 505 may be mechanically connected to part(s) of the first chassis 502 adjacent to a longitudinal side of the elongated opening 503 (or of a corresponding elongated cavity) or adjacent to two or more opposing longitudinal sides of the elongated opening 503. In some embodiments such as the one illustrated in FIGS. 5A, 5B and 5C, at least two of the plurality of cantilever-type supporting elements 505 may be mechanically connected to parts of the first chassis lying on opposite sides of the first opening 503 (e.g., to two opposing sides of the first chassis 502). Here, said plurality of cantilever-type supporting elements 505 are arranged on two opposing sides of the second antenna module 511 in four rows. In general, one or more rows of cantilever-type supporting elements may be provided. Said plurality of cantilever-type supporting elements 504 may be defined, in general, as discussed in connection with above embodiments. In this particular example, the plurality of cantilever-type supporting elements 505 are made of molded metal. First power distributions means (e.g., one or more coaxial cables) may be integrated into or attached to the plurality of cantilever-type supporting elements 505.

In some embodiments such as the one illustrated in FIGS. 5A, 5B and 5C, each of the one or more cantilever-type supporting elements 505 comprises at least a first section 508 connected to the first chassis 502 and extending substantially away from the first chassis 502 and a second section 509 extending substantially parallel to a (mid-)plane or a surface of the first chassis 502 so that the first antenna array 504 may be arranged over the opening 503 and thus over the second antenna module 511 (or specifically over the second antenna array thereof). The first and second section 508, 509 may be separated by a third section comprising at least one bend.

In some embodiments like the one illustrated specifically in FIG. 5C, the one or more cantilever-type supporting elements 505 may be implemented as two microstrip lines (as opposed to metallic structures integrating coaxial cables and thin metal sheets as in previous embodiments). In other words, a pair of printed circuit board elements cut to a particular curved and/or bent shape (specifically an 'L' shape in this example) may be used simultaneously both for implementing the cantilever-type support as well as for realizing a transmission line (i.e., power distribution means) for enabling transmission and reception of signals to and from the first antenna elements. In FIG. 5C, the microstrip feedlines (i.e., conductors) are shown in black. The sides of substrates of the printed circuit boards not having the microstrip feedlines may be covered by a metallic ground plane.

The first antenna module 501 also comprises a first antenna array 504 comprising eight first antenna elements. Each of the eight first antenna elements is connected to a first end of the one or more cantilever-type supporting elements 505 for arranging the first antenna array over the opening 503 (or at least partially over the opening 503). Specifically, each of the eight first antenna elements is attached, respectively, to a first end of the one or more cantilever-type supporting elements 505. In general, the first antenna array 504 may comprise one or more first antenna elements which may be connected to one or more first ends of the one or more cantilever-type supporting elements 505. In some alternative embodiments, a plurality of first antenna elements may be supported by a single cantilever-type supporting element 505.

In contrast to the previous embodiments, the first antenna module 501 comprises, in addition to the first antenna array, also other first antenna arrays 506, 507 arranged adjacent to the opening 503 (i.e., not above it) and to the first antenna array 504. These other antenna arrays 506, 507 may comprise low- or high-band antenna arrays, i.e., antenna arrays operating at frequencies lower than the second frequency band of the second antenna array of the second antenna module 511 (and possibly coinciding with the first frequency band of the first antenna array 504) and/or antenna arrays operating at frequencies within and/or above the second frequency band. For example, the other first antenna array 506 may be a low-band (dual-polarized) antenna array while the other first antenna array 507 may be a high-band antenna array operating, e.g., at a frequency band of 1.4-2.7 GHz band. The four columns of elements in the other first antenna array 507 (i.e., vertical column in FIG. 5A) may form 4 separate high-band antenna arrays (each comprising 11 dual-polarized dipole antenna elements).

In general, the first antenna module 501 may comprise one or more first antenna arrays in addition to the first antenna array 504. Alternatively, the first antenna module 501 may comprise no other passive antenna arrays than the first antenna array 504.

The second antenna module 511 of the antenna system 500 comprises a second front radome 512 arranged over the second antenna array (or specifically to cover the surface of the second antenna module 511 insertable into the opening 503 in the first chassis 502). The second antenna module 511 may further comprise a second back radome for covering the backside of the second antenna array. The second front and/or back radomes may be specifically adapted to at least partially conform to the shape of the opening 503 in the first chassis 502 of the first antenna module 501. The first antenna module 501 may also comprise at least one first front radome arranged over the first antenna module 501 and/or at least one first back radome arranged to cover the backside of the first antenna module 501 while still enabling the connectivity of the second antenna module 511 (not shown in FIGS. 5A, 5B and 5C). Theses radomes as well as any radomes to be discussed below are assumed to be substantially electromagnetically transparent at the operating frequencies of the first antenna array 504 and the second antenna array (or, in fact, at any radio or even infrared frequencies).

Due to the second radome 512, most of the elements of the second antenna module 511 are not visible in FIGS. 5A, 5B and 5C. Nevertheless, the second antenna module 511 may comprise at least a second antenna array (as mentioned above), a radio unit operatively coupled to the second antenna array for radio reception and/or transmission via the second antenna array and a second chassis onto which the second antenna array and the radio unit are mounted.

Figure 6:
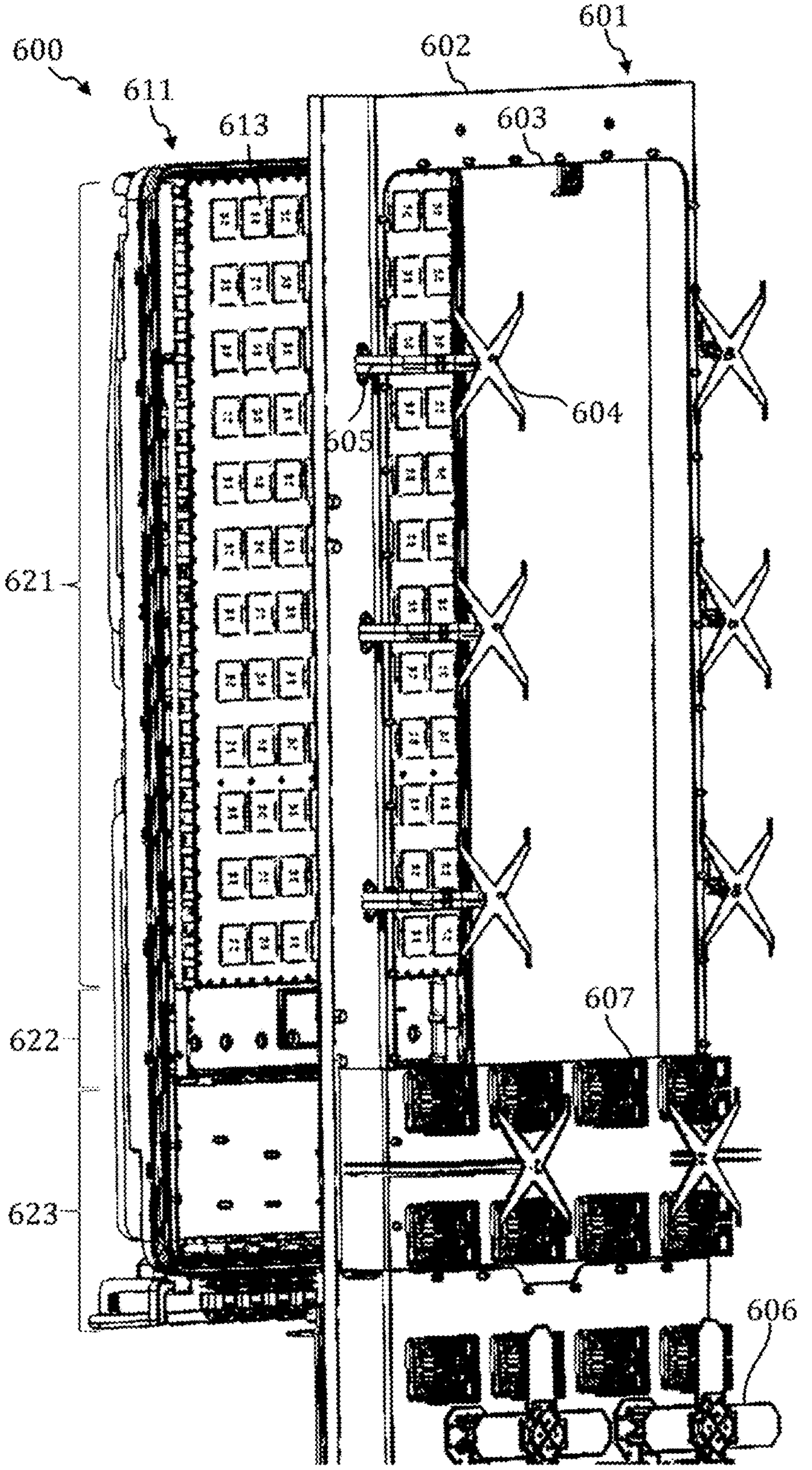

FIG. 6 illustrates another antenna system 600 according to embodiments. Specifically, FIG. 6 illustrates an antenna system 600 according to an exemplary embodiment partially in a perspective view without any second radome covering a second antenna module 611. As in above embodiments, the antenna system 600 comprises a first antenna module 601 and the second antenna module 611. In FIG. 6, the first and second antenna modules 601, 611 are shown detached from each other. In general, the antenna system 600 may correspond to the antenna system of FIG. 2G and/or antenna system 300 of FIGS. 3A, 3B and 3C. Elements 606, 607 may correspond to elements 506, 507 of FIGS. 5A, 5B and 5C. While FIGS. 3A and 3B omitted some (electromagnetically insignificant) structural features of the antenna system, FIG. 6 illustrates the antenna system 600 with all of said omitted elements included. The antenna system 600 may also correspond to the antenna system 500 of FIGS. 5A, 5B and 5C, apart from one key difference to be highlighted below.

Referring to FIG. 6, the first antenna module 601 of the antenna system 600 is adapted to be mountable onto the second antenna module 611, as discussed in connection with FIGS. 5A, 5B and 5C. The first chassis 602 of the first antenna module 601 comprises an opening 602 for enabling the second antenna array 613 of the second antenna module 611 to transmit and receive electromagnetic waves effectively even when the first antenna module 601 is mounted onto it, also similar to FIGS. 5A, 5B and 5C. Here, however, the opening is not adapted to extend over the whole second antenna module 611, as in the case of FIGS. 5A, 5B and 5C. The opening 603 is, in this embodiment, adapted to extend over a first section 621 of the second antenna module 611 comprising the second antenna array 613 and over a second section 622 of the second antenna module 611 adjacent to the second antenna array 613 (optionally comprising no antenna elements). The second antenna module 611 further comprises a third section 623 which is adapted to be fully covered by the first antenna module 601 when the first and second antenna modules 601, 611 are attached to each other. The third section 623 may comprise no antenna elements and thus there may be no detriment in arranging the first antenna module 601 directly on top of said third section 623.

Moreover, it should be noted that in the antenna system 600 of FIG. 6 only some of the first antenna elements of the first antenna array 604 (six first antenna elements in the illustrated example) are arranged over the opening 603 while others (two first antenna elements in the illustrated example) are arranged adjacent to the opening 603 (i.e., not over it but over a section of the first chassis 602 without an opening). Obviously, in such a case, the first chassis 602 (made at least partially of metal) acts as a ground plane for the first antenna elements not arranged over the opening 603.

Figure 7:
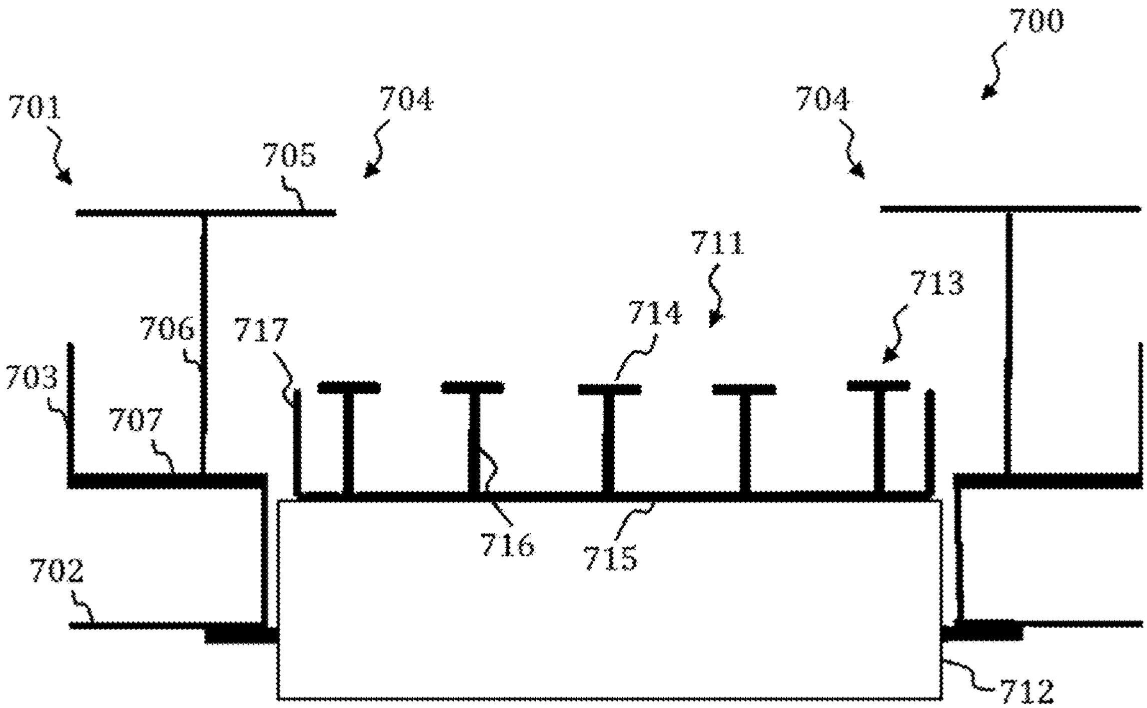
FIGS. 7, 8A, 8B, 9A and 9B illustrate an example of an antenna system or components thereof according to alternative embodiments where a cantilever-type supporting element is not provided.

While, in the above embodiments, the first antenna array of the first antenna module was arranged using a set of cantilever-type supporting elements 605 directly over the second antenna array of the active antenna module, in other embodiments, the first antenna array may, instead, be arranged adjacent to the second antenna array. In such embodiments, the first antenna array has its own ground plane, as opposed to only using the ground plane of the second antenna array as in the above embodiments. FIG. 7 provide a schematic illustration of this alternative according to embodiments. Specifically, FIG. 7 illustrates a simplified antenna system 700 according to an exemplary embodiment in a side view, similar to earlier FIG. 2G. It should be noted that FIG. 7 show a very simplified view where many of the elements of the antenna system 700 (e.g., some power distribution elements, a radio unit and radomes) have been omitted.

The previous discussion provided in connection with above embodiments applies, mutatis mutandis, to the following embodiments where no cantilever-type supporting elements are provided, unless otherwise explicitly defined.

Referring to FIG. 7, the antenna system 700 comprises a first antenna module 701 and a second antenna module 711. The first antenna module 701 comprises a first antenna array 704 of which two first antenna elements 705 are shown in FIG. 7 and the second antenna module 711 comprises a second antenna array 713 comprising a plurality of second antenna elements 714. Said two first antenna elements 705 are specifically arranged on opposing sides of the active antenna module 711. Similar to as described above, the second antenna array 713 may be a (5G) active massive MIMO antenna array and the first antenna array 704 may be a (4G or lower) passive antenna array (or even just a singular antenna). The operating frequency bands of the first and second antenna arrays 704, 713 may be defined as discussed above (e.g., in connection with FIG. 2G).

The first antenna array 704 may be specifically a one- or two-dimensional planar array with uniform antenna spacing. The first antenna array 704 is arranged adjacent to the second antenna array 713 of the second antenna module 711. In general, the first antenna elements 705 of the first antenna array may be arranged adjacent to one (longitudinal) side of the second antenna module 711 or adjacent to two opposing (longitudinal) sides of the second antenna module 711 (longitudinal direction pointing towards the Figure in FIG. 7). As shown in FIG. 7, the first antenna elements 705 may extend partially over the second antenna module 711. No cantilever-type supporting elements are used here, in contrast to previous embodiments. Instead, the plurality of first antenna elements 705 of the first antenna array 704 may be arranged, at least for the most part, over a (planar) metallic ground plane 707 of the first antenna module 701 (being different from the ground plane of the second antenna module 711). The plurality of first antenna elements 705 may be separated from this first ground plane 707 by free space (i.e., air) or by a substrate (on which the plurality of first antenna elements 705 may be printed and other side of which may be metallized to form the ground plane 707). The aforementioned λ/4 condition for the distance between the antenna elements 705 and the first ground plane 707 may be satisfied. In this embodiment, the first ground plane 707 may serve as a primary ground plane for the first antenna array 704 (as it lies, at least for the most part, directly below the first antenna elements 705) while the second ground plane 715 of the second antenna array 713 may serve as a secondary ground plane for the first antenna array 704 (and as the only ground plane for the second antenna array 713).

The plurality of first antenna elements 705 may be fed by feeding elements 706 which may form a part of the first power distribution means of the first antenna module 701 (other elements such as one or more phase shifters forming a first phase shifter network being, e.g., inside element 702) for enabling beamforming for the first antenna array 704. Said feeding elements 706 may act also as supporting elements for the plurality of first antenna elements 705 (e.g., in microstrip line feeding, the PCB(s) may provide support) or alternatively they may be integrated into separate supporting elements. The feeding may be arranged in similar manner as described in previous embodiments for the first antenna array and/or the second antenna array (e.g., with coaxial cables using baluns or with microstrip lines).

The plurality of first antenna elements 705 may have a similar design as discussed for the first (or second) antenna array in any of the previous embodiments. The element 702 may correspond to a first mechanical structure (similar to element 202 of FIG. 2G) (also referred to as a first mechanical structure 702) which may, for example, be or form a part of the chassis or frame of the first antenna module 701. The first mechanical structure 702 may, in practice, surround the second antenna module 711, fully or partly, such that an (elongated) opening or cavity is provided in the first mechanical structure 702 for receiving the active antenna module 711, similar to previous embodiments. The first mechanical structure 702 may be detachably attachable or mountable onto a second mechanical structure 712 (e.g., a second chassis or frame) of the second antenna module 711. However, no (wired) electrical connection may be (or needs to be provided) provided between the first and second antenna modules 701, 711. In other words, the first and second antenna modules 701, 711 may be fully independent radio modules connected to each other (only) mechanically.

The second antenna module 711 may correspond to the second antenna module 211 of FIG. 2G or any of the other embodiments discussed above. Specifically, elements 712 to 716 may correspond to elements 212 to 216 of FIG. 2G.

Finally, it should be noted that, similar to as discussed in connection with FIGS. 3A and 3B, vertical metallic walls 703, 717 extending orthogonally from the first and second ground planes 707, 715 are provided in the illustrated embodiment in order to better isolate the first and second antenna arrays 704, 713 from each other. In other embodiments, such elements 703, 717 may be omitted.

The functionality of being able to replace the second antenna module 711 with a bare ground plane so as to use the first antenna module 701 without the second antenna module 711, as discussed in connection with FIG. 2H, is applicable, mutatis mutandis, also for this alternative embodiment.

Figure 8A:
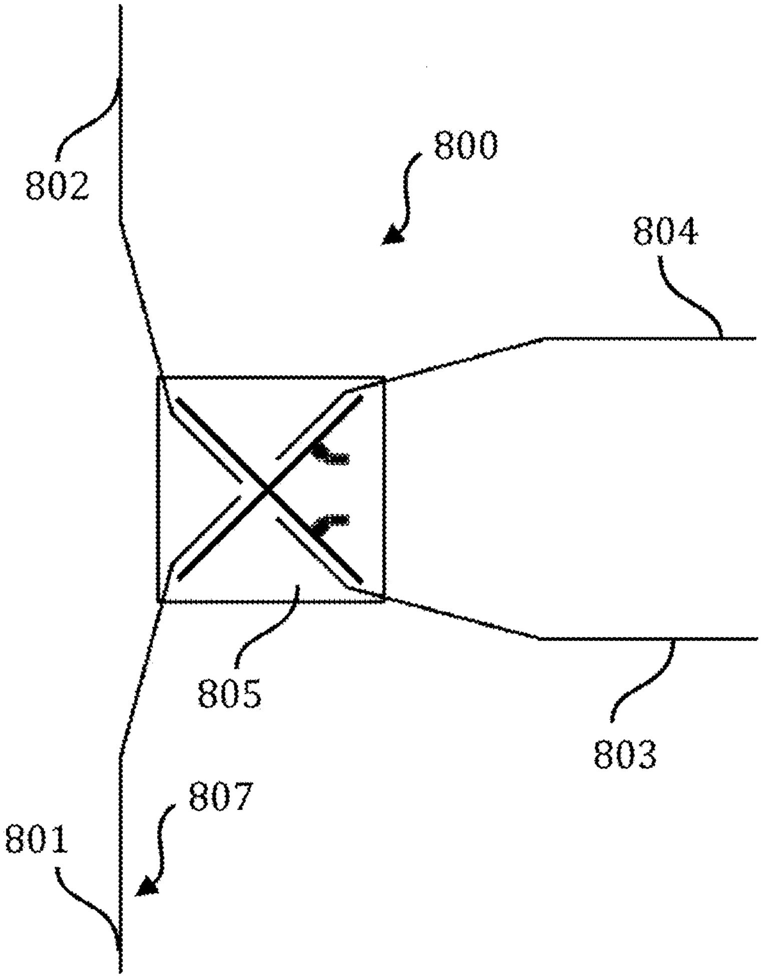
Figure 8B:
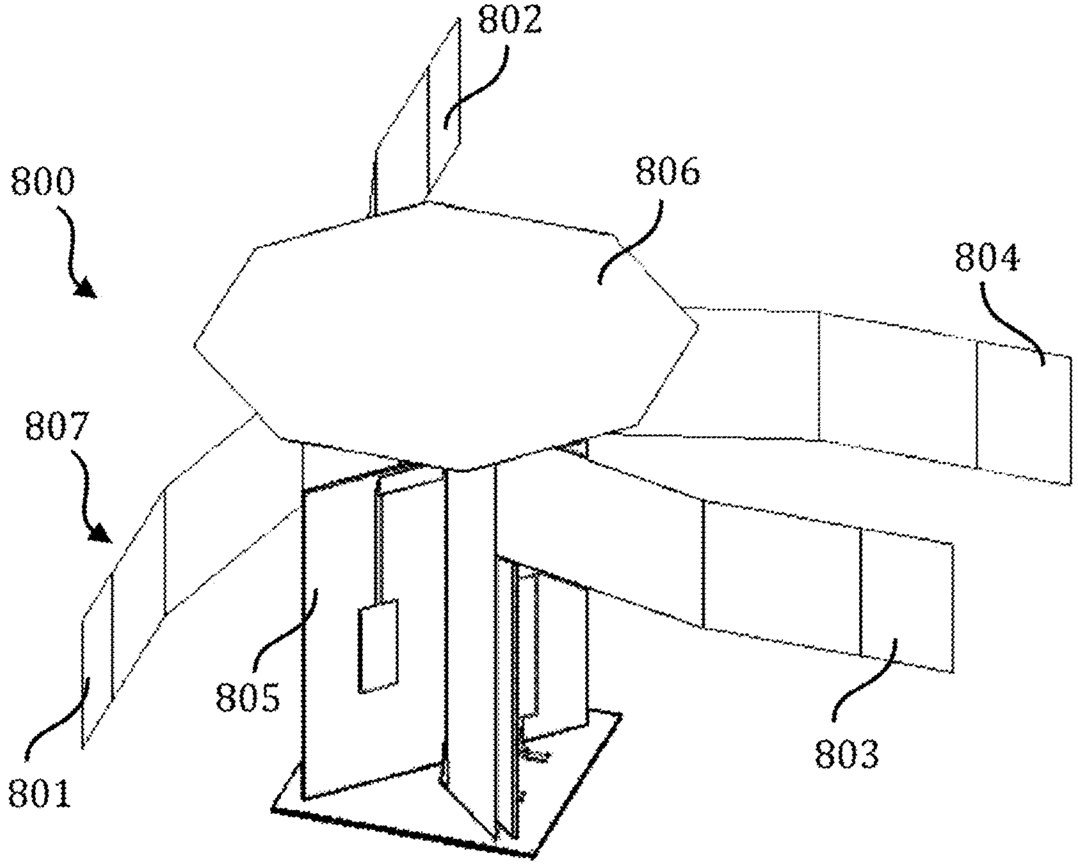

As the first antenna array is arranged predominantly adjacent to the second antenna module (as opposed to over it) in the alternative embodiment discussed in connection with FIG. 7, the overall width of the antenna system is somewhat increased compared to the previous embodiments. One way to reduce this width would be to reduce the size (or specifically width) of the first antenna elements of the first antenna array as much as possible. FIGS. 8A and 8B illustrate one exemplary antenna design according to embodiments which has been designed specifically with the design goal of having a small width in mind. Specifically, FIG. 8A shows the antenna element from above while FIG. 8B shows the antenna element in a perspective view.

Referring to FIGS. 8A and 8B, the illustrated first antenna element 800 is a variation of a parasitic-loaded crossed dipole antenna element. Specifically, the first antenna element 800 comprises a crossed dipole antenna element 807 where the four dipole arms 801, 802, 803, 804 have been effectively bent towards one side of the crossed dipole antenna element 807 so as to reduce its width (e.g., bent towards the right-hand side in FIG. 8A, where the width of the first antenna element corresponds to the left-right direction). Said bending may be achieved by bending the dipole arms of a regular crossed dipole with orthogonal straight arms in an appropriate manner or simply by manufacturing the first antenna element 800 to have the desired "bent" shape. Following "the bending", the first and second (adjacent) dipole arms 801, 802 (or at least distal sections thereof) may be substantially parallel with each other while the third and fourth dipole arms 803, 804 (or at least distal sections thereof) may also be substantially parallel with each other and substantially orthogonal to the first and second dipole arms 801, 802 (or at least distal sections thereof).

Relative to the first antenna module, the dipole arms 801, 802, 803, 804 of the crossed dipole antenna element 807 may be specifically bent towards the opening or cavity of the first chassis and/or away from it (i.e., towards the active antenna module when it is attached) so that the overall width of the antenna system may be reduced (i.e., less space needs to be provided in the first chassis for the first antenna array). In other words, each first antenna element may be arranged, e.g., so that the dipole arms 803, 804 in each first antenna element are facing said opening or cavity in the first chassis (third and fourth dipole arms 803, 804 optionally extending partially over the opening or cavity) or facing away from said opening or cavity in the first chassis. This way the overall width of the first chassis may be reduced as less space is taken by the first antenna array.

A (metallic) parasitic element 806 (in this example, specifically of octagonal shape) is arranged over the crossed dipole antenna element 807. Said parasitic element 806 may be defined as described in connection with previous embodiments.

The illustrated crossed dipole antenna element 807 may be fed using a microstrip-based feeding element 805 comprising two orthogonal concentric microstrip elements. In other words, the microstrip-based feeding element 805 may comprise two orthogonal concentric printed circuit boards onto which microstrip feedlines and possibly one or more distributed impedance matching elements (e.g., open or shorted stubs) have been printed.

FIGS. 9A and 9B illustrate, in a more detailed view compared to FIG. 7, an alternative antenna system 900 comprising first and second antenna modules 901, 911 according to embodiments. Specifically, FIGS. 9A and 9B illustrate the antenna system 900 according to an exemplary embodiment in a perspective view when the passive and active antenna modules 901, 911 are not yet attached to each other and in another perspective view when the first and second antenna modules 901, 911 are attached to each other. In general, the antenna system 900 may correspond to the antenna system 700 of FIG. 7. It should be noted that the second antenna array 913 is shown only in FIG. 9A (i.e., it is rendered invisible in FIG. 9B).

Referring to FIGS. 9A and 9B, the first antenna module 901 comprises a first chassis (or frame) 902 which is suitable for detachably mounting (or detachably attaching) onto a second antenna module 911 of the antenna system 900. The first chassis 902 may, at least for the most part, be made of a metal or an alloy. For enabling this, the first chassis 902 comprises a cavity 903 adapted to extend over the second antenna module 911 when the first chassis 502 is mounted onto the second antenna module 911 for minimizing antenna blockage caused by the first antenna module 901 (predominantly by the first chassis 902 thereof). The cavity 903 may specifically penetrate through the first chassis 902 in a direction orthogonal to a plane of the first chassis 902 (or equally orthogonal to the plane of the first antenna array 904). The cavity may be formed onto a lateral side of the first chassis 902. The arrow in FIG. 9A indicates the mounting direction. The cavity 903 may extend specifically at least partially over a second antenna array of the second antenna module 911 when the first chassis 902 is mounted onto the second antenna module 911. Once mounted, the first chassis 902 of the first antenna module 901 is adapted to substantially surround the second antenna module 911 (i.e., surround it from three sides with one lateral side being left open). In other words, the second antenna module 911 is embedded into the first chassis 902 of the first antenna module 901.

In other embodiments, an opening (or a hole) may be provided in the first chassis 902, instead of a cavity, similar to as shown in FIGS. 5A, 5B, 5C and 6.

As shown in FIGS. 9A and 9B, both the first chassis 902 and the opening or cavity 903 may have a shape which is elongated along the same direction. Further, the one or more first antenna elements may be arranged specifically adjacent to one or more longitudinal sides of the opening or cavity 902 (i.e., not necessarily adjacent to a lateral side of the opening or cavity 902).

The first antenna module 901 further comprises a first antenna array 904 comprising a plurality of (here, specifically eight) first antenna elements arranged on two opposing sides of the cavity 903. The first antenna array 904 (and associated feeding structure or element) may be mounted directly onto the first chassis 902 in this embodiment, as discussed above. The plurality of first antenna elements may be arranged adjacent to the cavity 903. The plurality of first antenna elements may partially overlap the cavity 903 (though they may predominantly lie over the first chassis 902 as shown in FIGS. 9A and 9B). The first antenna array 904 may be arranged substantially at a distance of λ/4 from the first chassis 902 acting as its ground plane and/or from the ground plane of the second antenna array 913 (which, thus, may also act as the ground plane for the first antenna array 204), where λ is a first wavelength being a wavelength corresponding to a frequency within the first frequency band of the first antenna array 904.

While a conventional crossed dipole antenna element design is used in the first antenna array 904 of FIGS. 9A and 9B, in other embodiments, the bent crossed dipole antenna element of FIGS. 8A, and 8B may be used instead. As mentioned above, said bent crossed dipole antenna elements may be arranged such that the third and fourth dipole arms 803, 804 are facing the cavity 903 (or facing away from the cavity 903).

Similar to as discussed in connection with FIGS. 5A, 5B and 5C, the first antenna module 901 may comprise, in addition to the first antenna array 904, also one or more other first antenna arrays 907 arranged over the first chassis 902 and adjacent to the cavity 903 (i.e., not above it) and to the first antenna array 904. Specifically, said one or more other first antenna arrays 907 may be arranged adjacent to the cavity 903 in a longitudinal direction of the first chassis 902, as opposed to being adjacent to the cavity 903 in a lateral direction of the first chassis 902 like the first antenna array 904. These other first antenna arrays 907 may be defined as discussed in connection with FIGS. 5A, 5B and 5C.

It should be noted that the first antenna module 901 comprises also a first front radome 921 for protecting the first antenna module 901 as well as the second antenna module 911 when it is attached to the first antenna module 901.

The first antenna module 911 of the antenna system 900 may correspond to the second antenna module 511 of FIGS. 5A, 5B and 5C and is thus not discussed here in further detail for brevity.

Further, in the condition of a high frequency band antenna array (e.g., a 5G MIMO antenna array or an antenna array comprising one or more frequency band radiating elements, such as a 5G antenna), the radiation position of the additional radiating element (e.g. a low frequency band radiating element, such as a 4G antenna element or an antenna array sending or receiving a signal lower than the frequency of the high frequency band array) may be placed above the high frequency antenna array while the feeding location of the additional radiating element may be placed outside the high frequency antenna array area. The principle of the idea is mechanically like a cantilever umbrella where its coverage (radiation area) is separated from its feeding area (mechanical fixation location). According to some embodiments of the present disclosure, the distance between the two locations is not theoretically limited. The distance between the radiation area and the mechanical fixation area may be a few millimeters, a few centimeters, a few meters, tens of meters, hundreds of meters, thousands of meters, or even greater.

For simplicity, in the following description, a 5G MIMO antenna array is taken as an example of a high frequency band antenna array, and a 4G antenna is provided as an example of a low frequency band radiating element. In some embodiments, the area where the radiating element is located is completely different from the area where the mechanical fixation location is located. For example, the radiating element may generate an electromagnetic field on top of the antenna chassis, and its mechanical fixation location is different from the chassis. Alternatively, the mechanically fixing means of the radiating element may be disposed at the rear part of the antenna chassis and having a certain distance away from it.

In some embodiments, the radiating element conforms to some physical rules. For example, the radiating element is a bipole, and its dimension, position on the chassis and feeding method affect its overall capability (impedance matching, efficiency, pattern shape and the like). In some embodiments, the radiating element is used within the coverage of the base station antenna, and it is considered to be advantageous that the radiating element is placed, for example, at ¼ of the wavelength on the ground plane. In some embodiments, a balanced transmission line is used to feed a half-wave dipole, which matches the natural impedance of, for example, a 50-ohm feedline. Then, a balun is introduced into the feedline that connects the radiating element to the mechanical fixation location.

Figure 10:
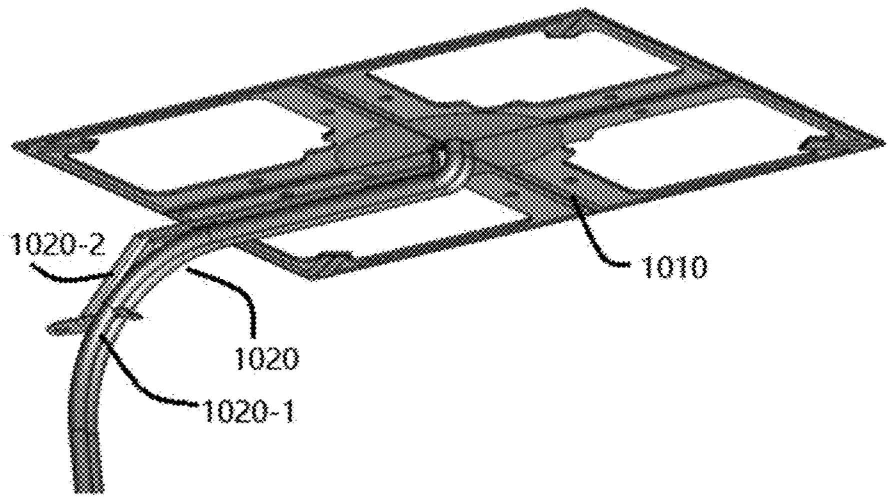
FIG. 10 illustrates an example where a first end of a cantilever-type supporting element is connected to an antenna, according to some embodiments of the present disclosure.

FIG. 10 illustrates an example of an antenna element (also referred to as "radiating element) 1010 to which a first end of a cantilever-type supporting element 1020 according to some embodiments of the present disclosure. The radiating element 1010 may be the first antenna element 205 of FIG. 2G, the first antenna element 305 of FIGS. 3A and 3B, or the first antenna element 705 of FIG. 7.

In some embodiments, the radiating element 1010 may be positioned (mounted) at a certain position ("fixation location," or "mount position") and may radiate at another position ("radiating location") that may be remote from its fixation location, and the specific topology is particularly meaningful in the communication field for an antenna module comprising the radiating element 1010. In some embodiments, the cantilever-type supporting element 1020 includes power distribution means 1020-1 arranged in the cantilever-type supporting element, for distributing power to or delivering power from the radiating element 1010. Additionally or alternatively, the power distribution means 1020-1 incudes one or more pairs of coaxial cables, and one or more pairs of corresponding baluns 1020-1 are mechanically connected to the power distribution means 1020-1, as shown in FIG. 10. In some embodiments, an extension of the balun may form an angle of (+/−) 45° with respect to the plane defined by the radiating element 1010, as shown in FIG. 10.

The elements 1010, 1020, 1020-1, 1020-2 of FIG. 10 may correspond, mutatis mutandis, to elements 205, 203, 203-1, 203-2 of FIG. 2F as described above, unless otherwise explicitly stated.

Figure 11:
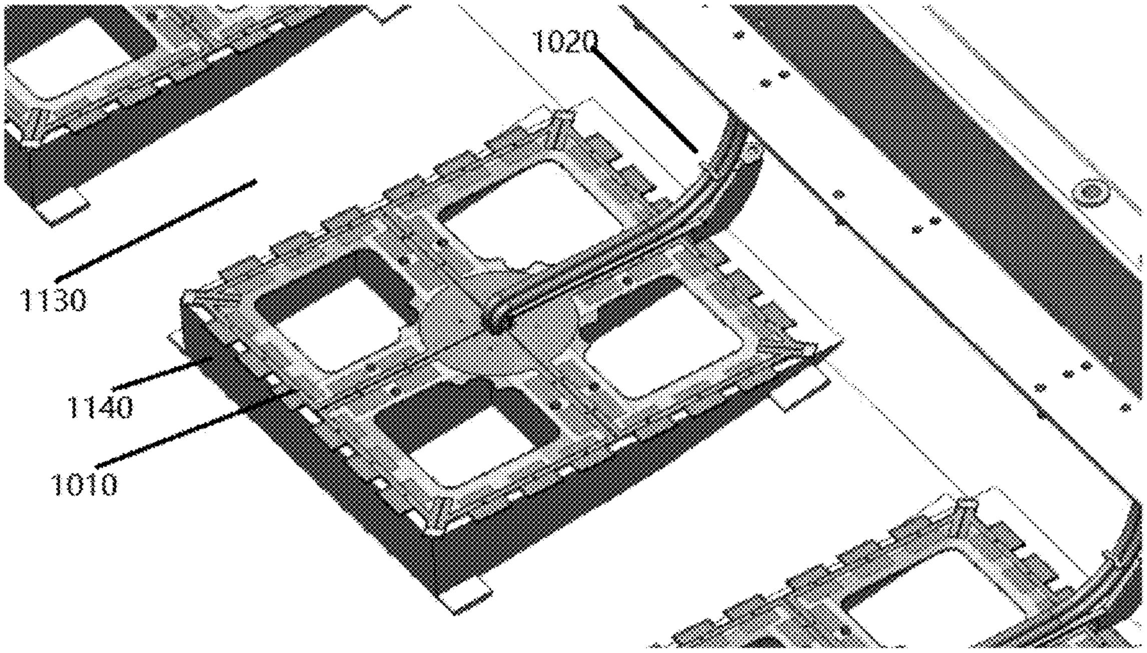
FIG. 11 illustrates an example where an antenna having a cantilever-type supporting element is assembled onto a radome via a radiating part handler, according to some embodiments of the present disclosure.

FIG. 11 illustrates an example where an antenna having a cantilever-type supporting element is assembled onto a radome via a radiating part handler 1140, according to some embodiments of the present disclosure.

Figure 12:
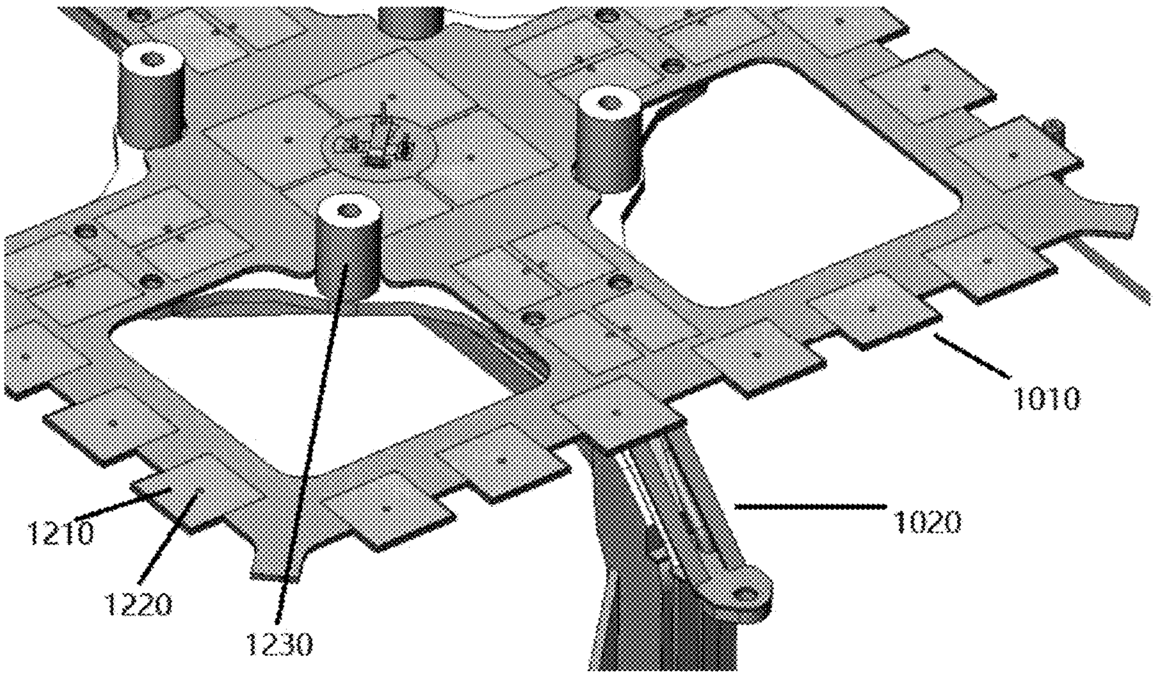
FIG. 12 illustrates an example of an antenna in an enlarged view according to some embodiments of the present disclosure.

FIG. 12 illustrates an example of an antenna in an enlarged view according to some embodiments of the present disclosure.

As shown in FIG. 12, the radiating element 1010 comprises a stud 1230 (see FIG. 12), and the radiating element 1010 is mechanically connected via the stud 1230 to the radiating part handler 1140 (not shown in FIG. 12 for brevity; see FIG. 11 for more details).

In some embodiments, the radiating element 1010 may radiate on a 5G radiating element comprised in an active antenna. The electromagnetic fields thereof may be coupled to each other, which may generate interference in both the radiating element 1010 and the 5G radiating element. Therefore, it is necessary to cause the radiating element 1010 to be somehow "transparent" relative to the 5G radiating element. In an embodiment, some "patches" are added to a wire (copper trace) of the radiating element 1010 by means of vias. As shown in FIGS. 11 and 12, the radiating element 1010 comprises a plurality of patches and vias 1220, and those "patches+vias" are arranged in series along a LB PCB copper wire, which may be used as a self-capacitance system (see FIG. 14). Metal or alloy is formed in the vias so that the antennas respectively located on two sides of the printed circuit board and the patches are electrically connected to each other.

Figure 13A:
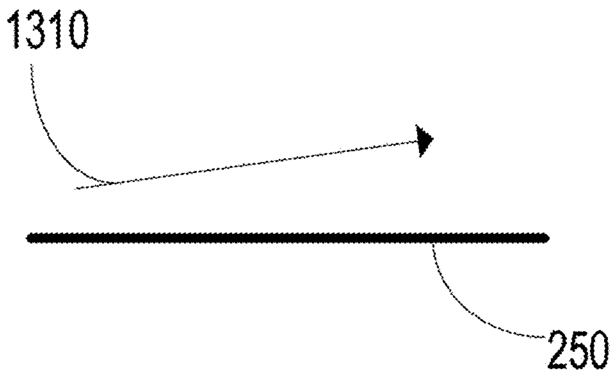
FIGS. 13A and 13B illustrate how a low-band (LB) antenna ("radiating element") with a "patch" filters 5G current according to some embodiments of the present disclosure.
Figure 13B:
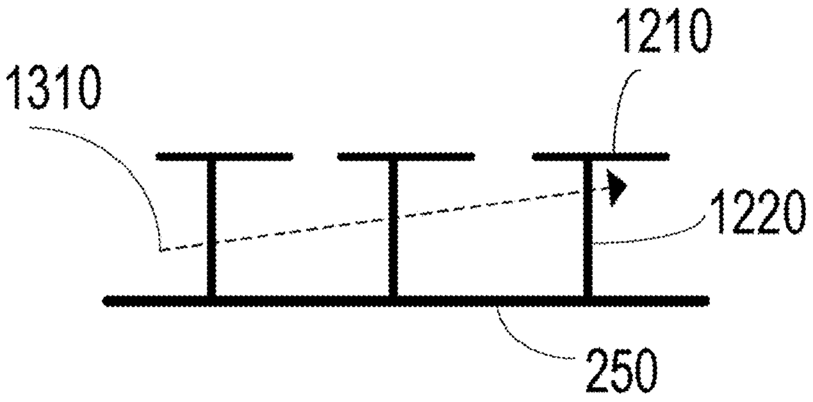

FIGS. 13A, 13B illustrate how a low-band (LB) microstrip antenna ("radiating element") with a "mushroom" filters 5G current according to some embodiments of the present disclosure. Here, the "mushroom" refers to a T-shaped patch 1210 that can be connected to the antenna via a through hole (via) 1220 formed in the printed circuit board. As shown in FIG. 12, each patch 1210 comprises a through hole (via) 1220. Accordingly, as seen from the sectional view, it looks like a T-shaped "mushroom," as shown in FIG. 13B.

As shown in FIG. 13A, the radiating element 1010 does not include "patches+vias," and 5G current 1310 generated/sensed in the 5G radiating element is floating. As shown in FIG. 13B, the radiating element therein is designed as comprising "patches+vias," where the 5G current 1310 generated/sensed by the 5G radiating element is filtered out (at least reduced).

Figure 14:
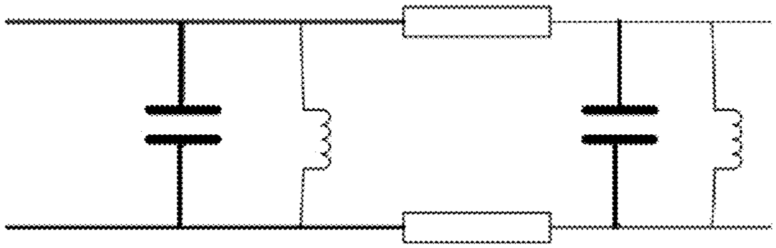
FIG. 14 illustrates an equivalent circuit of FIG. 12 according to some embodiments of the present disclosure.

FIG. 14 illustrates an equivalent circuit of FIG. 12 according to some embodiments of the present disclosure. The equivalent inductance-plus-capacitance system (L+C system) as shown in FIG. 14 may be used as a filter, which is helpful to inhibit (or at least reduce) the 5G current floating at the radiating element 1010.

FIGS. 15, 16, 17 and 18 illustrate how an LB antenna module (the first antenna module) is assembled according to some embodiments of the present disclosure. Reference now will be made to FIGS. 15, 16, 17 and 18 to describe an example arrangement of the radiating element 1010 and the cantilever-type supporting element 1020. In the following will be described a "BB4L" polarized multiband antenna arrangement embedded in a 5G MIMO active array, i.e., multiband integration is taken into consideration. The BB4L arrangement includes two low-band dual-polarized passive array (617-960 MHz) ("B" band), four mid-band dual-polarized passive array (1695-2690 MHz) ("L" band) and a 12×8 5G high-band MIMO dual-polarized active array (3300-4200 MHz).

Figure 15:
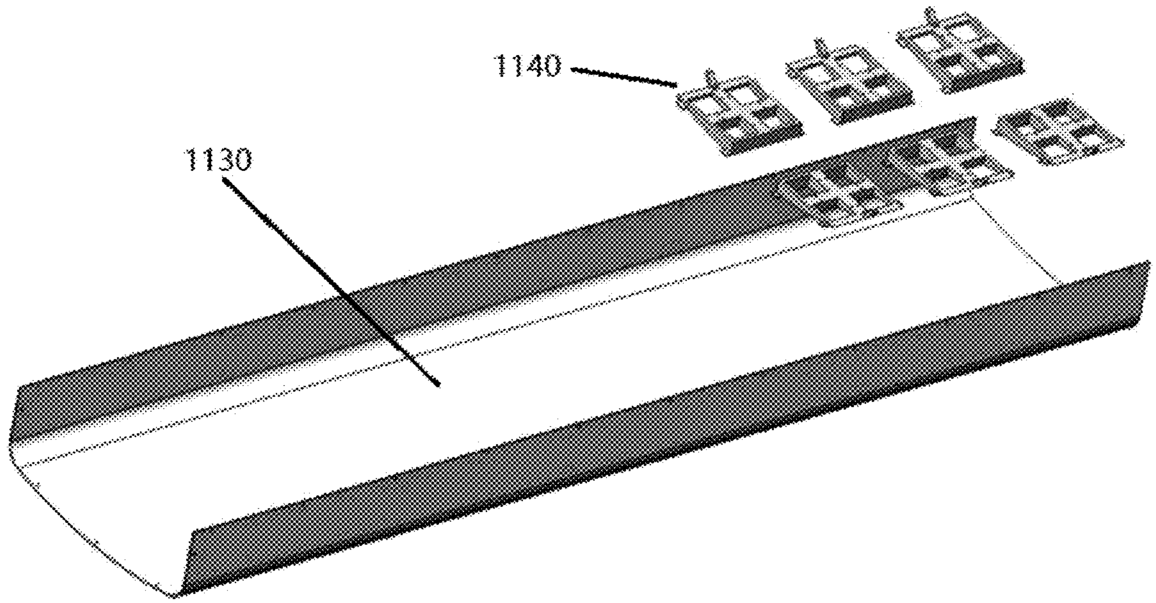
FIGS. 15, 16, 17 and 18 illustrate how an LB antenna module is assembled according to some embodiments of the present disclosure.
Figure 16:
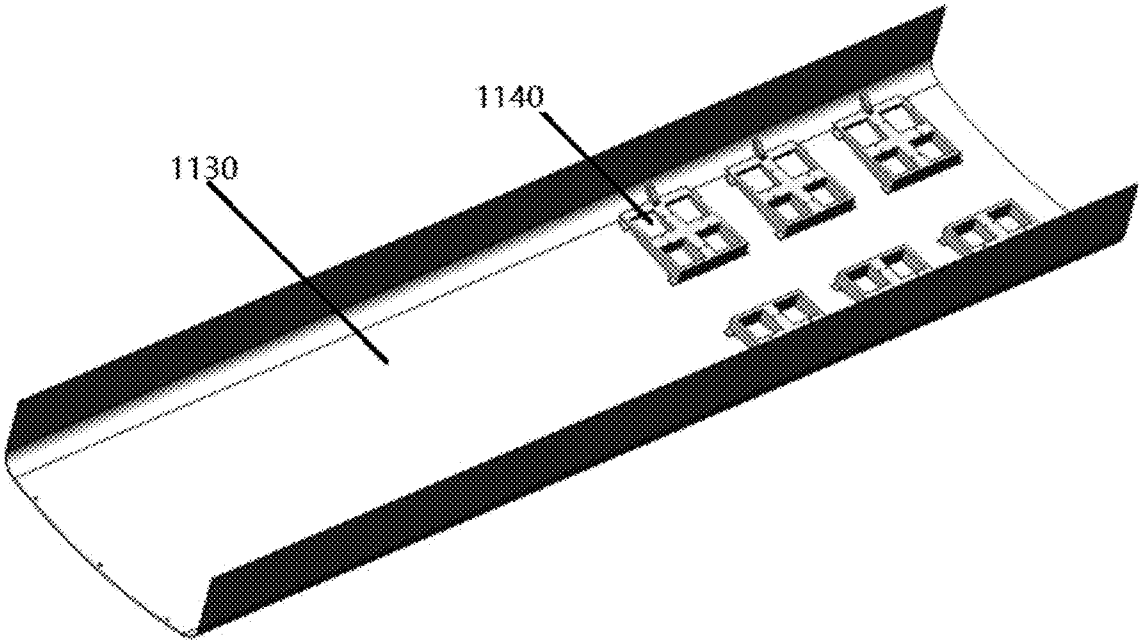

FIG. 15 illustrates a radome 1130, where a plurality of radiating part handlers 1140 are mounted on inner surfaces of the radome 1130. In some embodiments, the radiating part handlers 1140 are glued to the randome 1130, as shown in FIG. 16.

Figure 17:
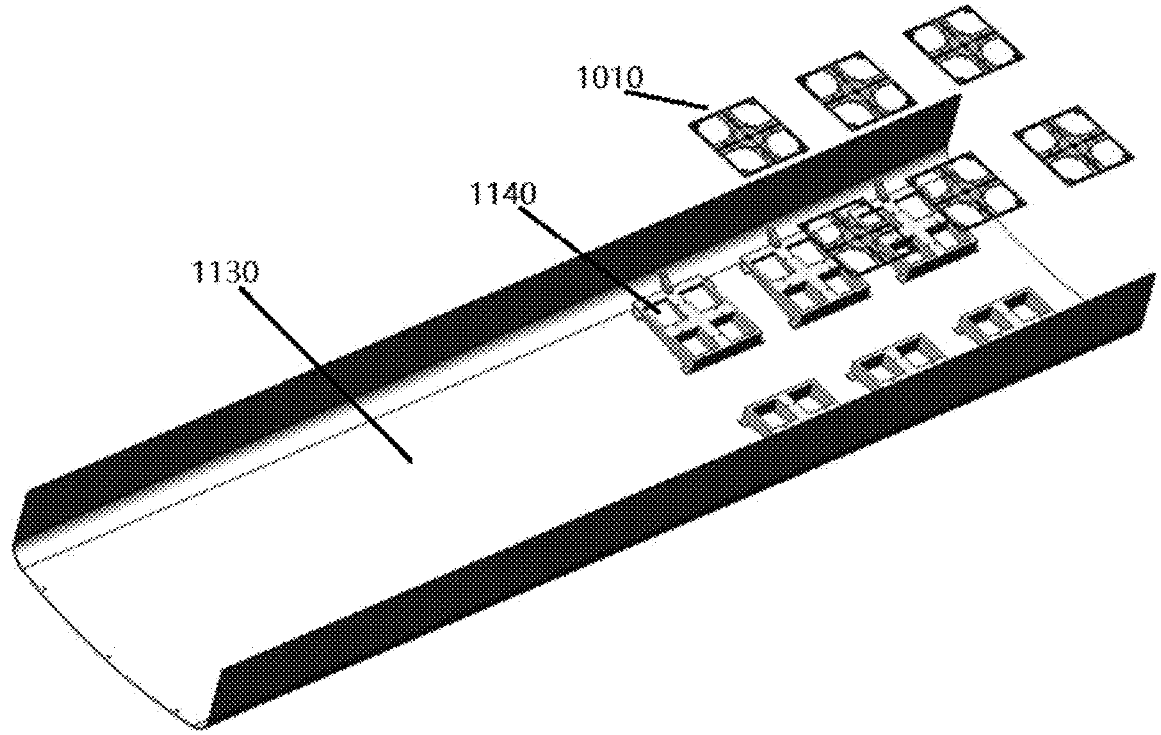
Figure 18:
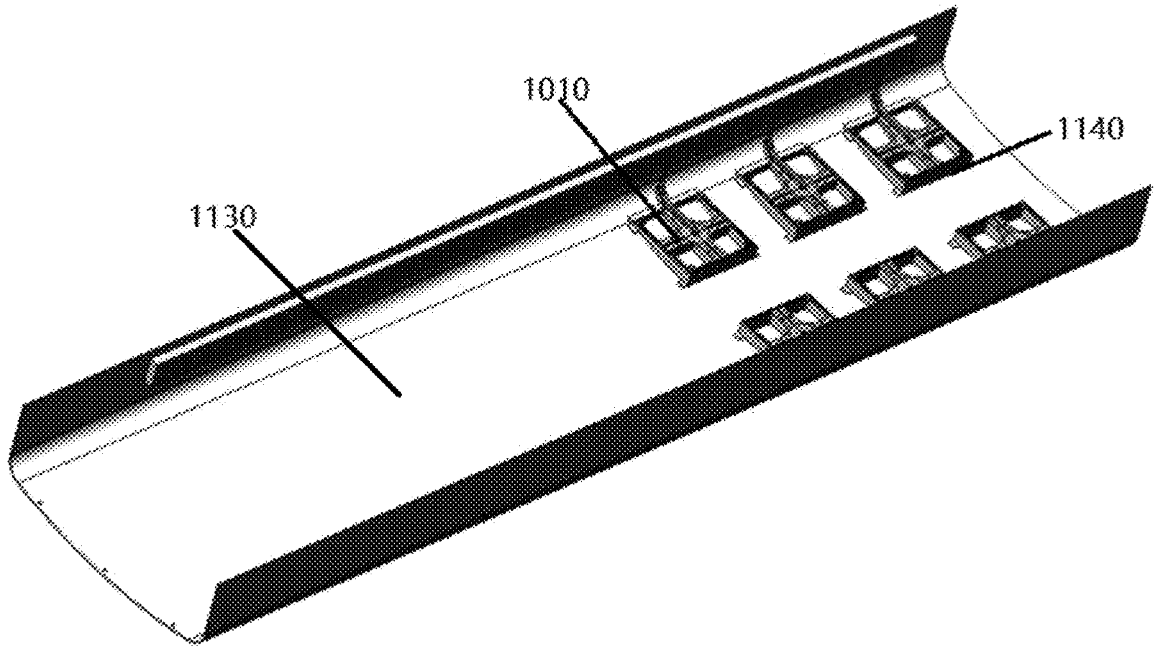

As shown in FIG. 17, a plurality of radiating elements 1010 (e.g. LB radiating elements) are then mechanically connected to the radiating part handlers. In some embodiments, the radiating element 1010 is a printed circuit board (PCB). In some embodiments, the radiating element 1010 is mechanically connected to the radiating part handler 1140 via the stud 1230 (see FIG. 12) on the radiating element 1010 and a screw hole (not shown for brevity) in the radiating part handler 1140. In other words, by screwing the radiating element 1010 to the radiating part handler 1140, the radiating element 1010 can be fixed onto the radome 1130 via the radiating part handler 1140 and held by the radome 1130, as shown in FIG. 18.

Figure 19:
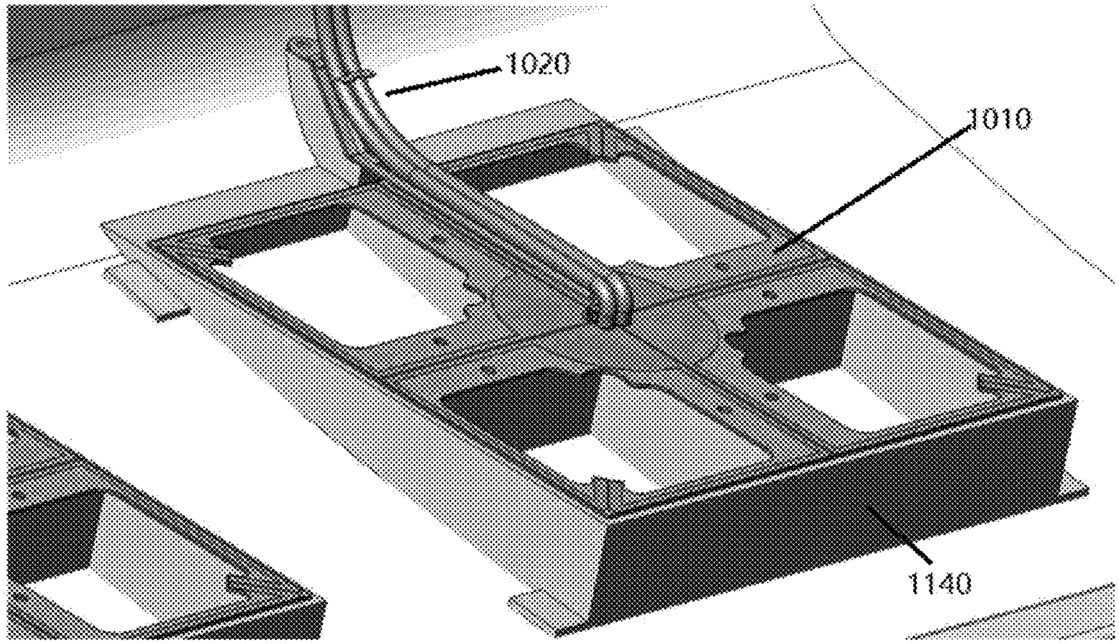
FIGS. 19 and 20 illustrate a relative positional relation among components of an LB antenna module according to some embodiments of the present disclosure.
Figure 20:
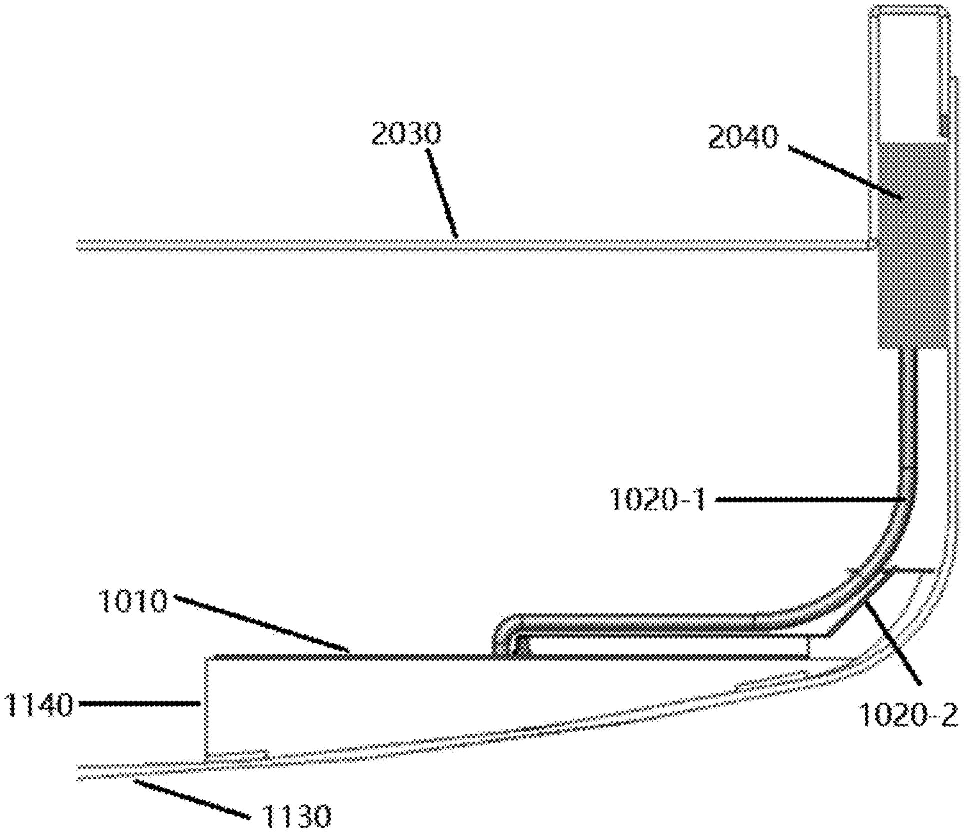

FIGS. 19 and 20 illustrate a relative positional relation among respective components of an antenna module comprising one or more radiating elements 1010 according to some embodiments of the present disclosure. As shown in FIG. 19, the cantilever-type supporting element 1020 at one end is mechanically connected to the radiating element 1010. For example, the connection position between the cantilever-types supporting element 1020 and the radiating element 1010 may be a center position at the upper side of the radiating element 1010 (the side opposite to the side of the radiating element 1010 contacting with the radiating part handler 1140) (as state above, when the radiating element 1010 is mechanically connected to the radiating part handler 1140, one side of the radiating element 1010 contacts with the radiating part handler 1140). For example, the connection position between the cantilever-type supporting element 1020 and the radiating element 1010 may be another position at the upper side of the radiating element 1010, for example, a position offset from the center position of the radiating element 1010.

FIG. 20 is a schematic diagram illustrating a relative positional relation among respective parts of an antenna module comprising one or more radiating elements 1010 according to some embodiments of the present disclosure. For example, the positional relation among an antenna chassis 2030, a phase shifter network (PSN) 2040, a coaxial cable 1020-1, a balun 1020-2, a radiating element 1010, a radiating part handler 1140 and a randome 1130 is illustrated in FIG. 20.

In some embodiments, the radiating element 1010 may be connected to the transverse PSN 2040 that extends along the radome 1130 and feeds one or more radiating element 1010. For example, the feedline of the radiating element 1010 is directly connected to the PSN 2040, and none of the radiating elements 1010 is directly supported by the antenna chassis 2030.

In some embodiments, the PSN 2040 may be a compact PSN, i.e., the PSN functions are not distributed within an elongate transverse unit, but all the related functions (a splitter and a phase shifter) are regrouped within a centralized block.

Figure 21:
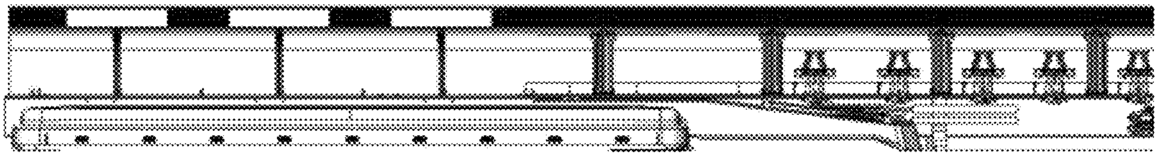
FIGS. 21, 22A and 22B illustrate how a further antenna module is assembled according to some embodiments of the present disclosure.

FIG. 21 illustrates that an active MIMO antenna module (the second antenna module) is detachably mounted on the antenna chassis 2030, and a LB antenna module comprising one or more radiating elements 1010 is detachably mounted on other part of the same antenna chassis 2030. With such arrangement, the active MIMO antenna module is not included in or covered by the LB antenna module comprising one or more radiating elements 1010. The radome of the MIMO antenna module is placed near or adjacent to the ground reference of the LB antenna module.

Figure 22A:
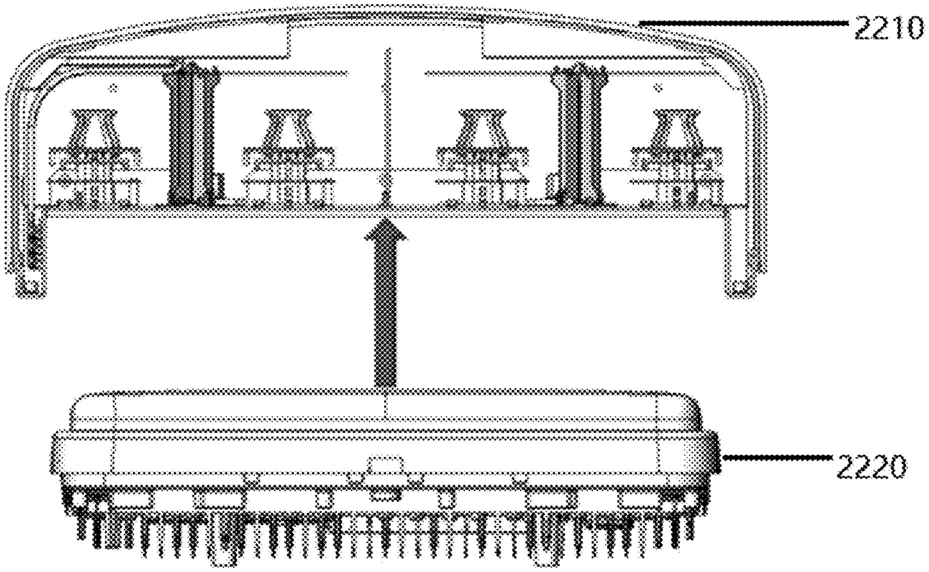
Figure 22B:
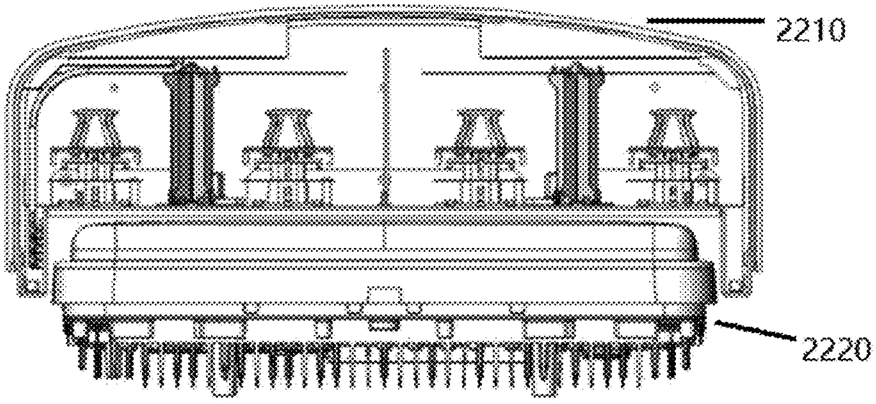

FIGS. 22A and 22B illustrate how an active MIMO antenna module 2220 is assembled according to some embodiments of the present disclosure. As stated above with reference to FIGS. 15, 16, 17 and 18, a LB antenna module 2210 comprising one or more radiating elements 1010 and one or more cantilever-type supporting elements 1020 according to the present disclosure is manufactured. As shown in FIG. 22A, the LB antenna module 2210 comprising one or more radiating elements 1010 and one or more cantilever-type supporting elements 1020 according to the present disclosure is arranged on top of the antenna chassis 2030. In some embodiments, the LB antenna module 2210 may be used separately in a stand-alone mode. In the case, a reflector ("ground plane") of the radiating element 1010 is ensured by a separate detachable part. For example, the separate detachable part may be a detachable conductive layer, and when the active MIMO antenna module 2220 is not mounted on the opposite side (relative to the LB antenna module 2210) of the antenna chassis 2030, the detachable conductive layer may act as a "ground reference" of the radiating element 1010 and conceal the chassis hole.

In some embodiments, the active MIMO antenna module 2220 is detachably mounted on the antenna chassis 2030 from the opposite side. For example, the active MIMO antenna module 2220 may be inserted on the back side of the antenna chassis 2030 relative to the LB antenna module 2210, as shown in FIGS. 22A and 22B. In the circumstance, the separate detachable part may not be required. Alternatively, the detachable conductive layer may be suppressed, and the "ground layer" of the radiating element of the MIMO antenna module 2220 may act as a "ground layer" for the one or more radiating elements 1010 comprised in the LB antenna module 2210.

In some embodiments, prior to mounting the active MIMO antenna module 2220, the detachable conductive layer is preferably not removed in the on-site scene. In the circumstance, a frequency selective surface (FSS) may be used. FSS is a well-known "metamaterial" device, which has been widely used in the background of the radar systems at least since 1980s. By using the FSS layer, a detachable conductive layer to be suppressed on site is not required any longer. In addition, the FSS layer can filter signals (spurious emissions) from the external not required by the active MIMO antenna module 2220 and the LB antenna module 2210.

Figure 23:
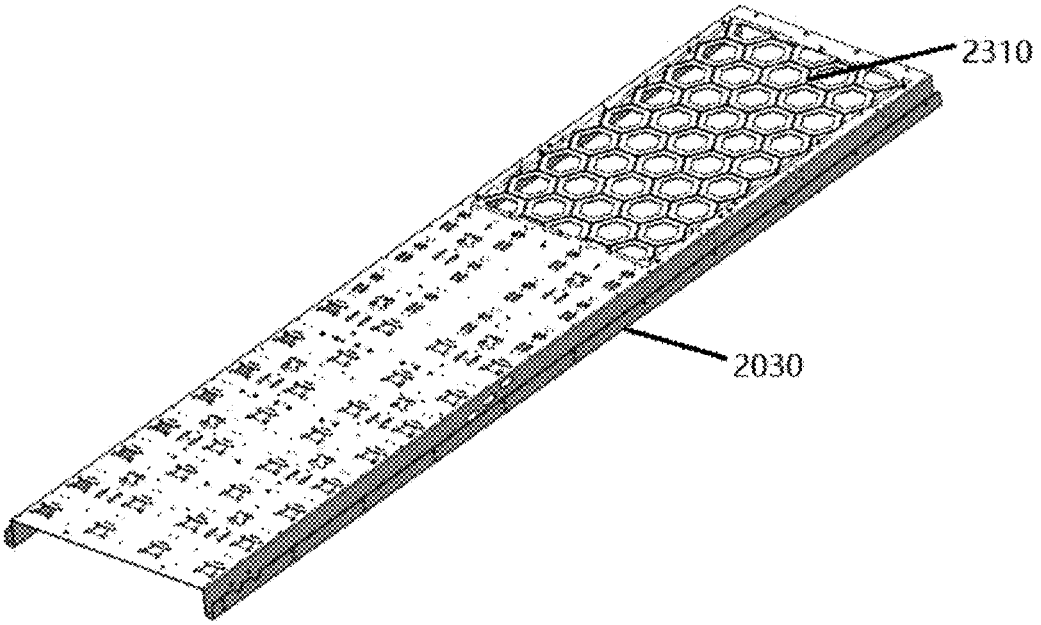
FIG. 23 illustrates an example chassis having a FSS layer according to some embodiments of the present disclosure.

FSS may have multiple applications. In some embodiments, a FSS layer 2310 may be fixed to the LB antenna module 2210, as shown in FIG. 23. In some embodiments, the FSS layer may be fixed to the active MIMO antenna module 2220. In some embodiments, the FSS layer may consist of a plurality of (at least 2) layers, among which at least one FSS layer may be fixed onto the LB antenna module 2210, and at least one FSS layer may be fixed onto the active MIMO antenna module 2220. Such configuration has the advantage that, when the active MIMO antenna module 2220 is not mounted, the LB antenna module 2210 may act/operate in the stand-alone mode. When the active MIMO antenna module 2220 is used in the stand-alone mode, the FSS may filter unwanted signals, such as spurious signals as intermodulation products, from the inside to the outside or in the other way around. For example, the active MIMO antenna module 2220 generates massive spurious emissions, the FSS may act as an EMC-EMI (Electro Magnetic Compatibility-Electromagnetic Interference) shield, and the active MIMO antenna module 2220 therefore can be placed near other antenna or any unwanted signal source. For example, the active MIMO antenna module 2220 (in particular, an active MIMO antenna module 2220 designed for a TDD (Time Division Duplexing) modulation system) may be used as a PIM generator, and the FSS layer may be used as an EMC-EMI shield layer to filter out unwanted signals, to thus improve the communication quality, for example, communication quality parameters including RSSI (Received Signal Strength Indicator), CQI (Channel Quality Indicator) and the like.

In some embodiments, the FSS layer may be fixed to the LB antenna module 2210. For example, the FSS may be designed on the printed circuit board (PCB). In addition, a PCB is typically a relatively flexible material, and an important PCB thickness is therefore required for convenient placement and hardness. Such important PCB thickness incurs extra costs, for example, additional RF losses. Accordingly, it is advantageous to design some specific FSS units that are compatible with standard metal etching techniques in terms of dimensions and required tolerances. In the circumstance, the FSS function can be directly implemented in the entirety of the LB antenna module 2210.

FIG. 23 illustrates an example chassis according to some embodiments of the present disclosure. As shown in FIG. 23, in order to reinforce the filtering capability of the FSS layer, for example, the FSS layer is designed in a hexagon shape. Also as shown in FIG. 23, in order to reinforce the filtering capability of the FSS layer, for example, a few FSS layers may be stacked. For example, considering a bandpass filtering function over a 3.3-3.8 GHz frequency band, a first FSS layer may have a thickness within a range of a few millimeters (e.g., 1 to 4 mm, corresponding to the thickness of the chassis), and (e.g. to restrict costs as weights) the thickness of the second FSS layer may be less than a millimeter or in the millimeter range (e.g. from 0.2 millimeters to 1 millimeter), and the dimension of the unit in use is about 80-90 millimeters (e.g. in the form of hexagonal cells). The chassis and the second FSS layer may be designed on any type of conductive layer. For example, aluminum may be used to design the second FSS layer. In some embodiments, one or more FSS layers are integrated in the chassis, in practice. In other words, one or more FSS layers may be directly stamped from the metal chassis, i.e., the FSS is a part of the chassis, rather than an additional component to be assembled.

Figure 24:
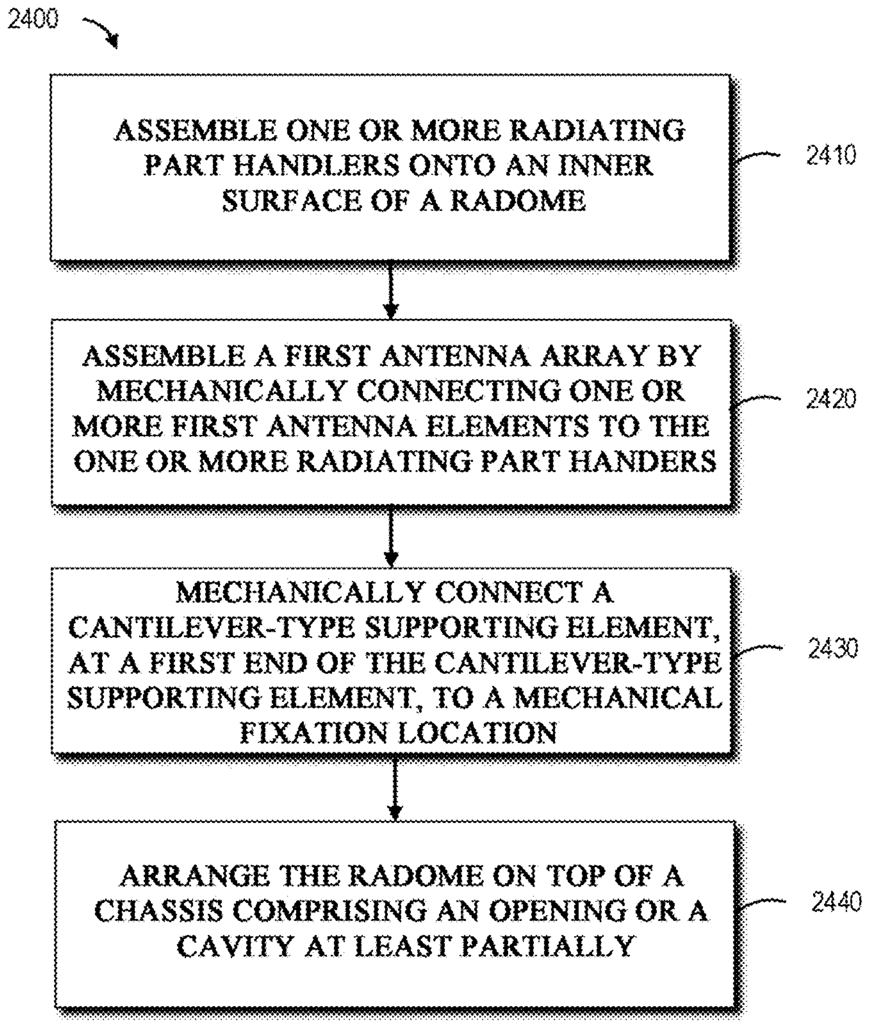
FIG. 24 illustrates an example flowchart of assembling a LB antenna module according to some embodiments of the present disclosure.

FIG. 24 illustrates an example flowchart 2400 of assembling a LB antenna module 2210 according to some embodiments of the present disclosure.

In step 2410, one or more radiating part handlers 1140 are assembled onto an inner surface of the radome 1130, as shown in FIGS. 15 and 16.

In step 2420, one or more first antenna elements 1010 are assembled by mechanically connecting them to one or more radiating part handlers 1140, as shown in FIGS. 17 and 18.

In step 2430, one or more cantilever-type supporting elements 1020 at one or more first ends are mechanically connected to mechanical fixation locations.

In step 2440, the radome 1130 is arranged above the antenna chassis 2030. The antenna chassis 2030 at least partly comprises an opening or a cavity. One or more first antenna elements 1010 are connected to one or more second ends of the one or more cantilever-type supporting elements 1020, to arrange a first antenna array above the opening or cavity, and the radome 1130 is configured to hold the first antenna module above the chassis.

In some embodiments, the distance between the radiating element 1010 and the antenna chassis 2030 in the direction perpendicular to the antenna chassis 2030 is λ/4, where k is a wavelength of a signal sent or received by the radiating element 1010. In some embodiments, the distance between the radiating element 1010 and the mechanical fixation location of the cantilever-type supporting element 1020 in longitudinal to the antenna chassis 2030 is not limited, i.e., the distance may be significantly great. For example, the distance may be a few millimeters, a few centimeters, a few meters, tens of meters, hundreds of meters, or thousands of meters or even greater. For example, the distance may be one of λ/4, λ/2, λ, 2λ, and other multiples of k.

Therefore, one of the advantages of the embodiments of the present disclosure is that any part of the radiating element 1010 is not fixed onto the antenna chassis 2030, which enables more flexible assembling of an antenna module comprising the radiating element 1010 and a cantilever supporting element 1020. For example, in some embodiments, the radiating portion of the dipole may be supported by the radome 1130. Additionally or alternatively, the feedline may be directly connected to the phase shifter network (PSN) block which is also arranged on the radome 1130. The power distribution means may be sandwiched between the antenna chassis 2030 and the radome 1130 at the intermediate portion of the feedline. With such arrangement, the movement of the power distribution means may be limited, thus improving the stability of the radiating element 1010 supported by the cantilever-type supporting element 1020.

In some embodiments, the distance between the radiating element 1010 and the chassis in the direction perpendicular to the antenna chassis 2030 is λ/4, where k is a wavelength of a signal sent or received by the radiating element 1010. In some embodiments, the distance between the radiating element 1010 and the mechanical fixation location of the cantilever-type supporting element 1020 in longitudinal to the antenna chassis 2030 is not limited, i.e., the distance may be significantly great. For example, the distance may be a few millimeters, a few centimeters, a few meters, tens of meters, hundreds of meters, or thousands of meters or even greater. For example, d=(N+M/4), where λ is a first wavelength corresponding to the operating frequency of the radiating element 205, N is a natural number (e.g. N=0, 1, 2 . . . ), and M is an integer ranging from 1 to 3 (i.e., M is 1 or 2 or 3). Specifically, the distance may be one of λ/4, λ/2, λ, 2λ, and other multiples of λ.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

We claim:

1. A first antenna module, comprising:

a chassis comprising an opening or a cavity;

one or more cantilevers mechanically connected, at one or more first ends of the one or more cantilevers, to a mechanical fixation location; and a first antenna array comprising one or more first antenna elements connected to one or more second ends of the one or more cantilevers for arranging the first antenna array over the opening or cavity, the one or more first antenna elements being mechanically connected to one or more radiating part handlers that are assembled on an inner surface of a radome over the chassis, the radome being configured to hold the first antenna array.

2. The first antenna module of claim 1, wherein a lateral or longitudinal distance to the chassis between the first antenna array and the mechanical fixation location is not limited.

3. The first antenna module of claim 1, wherein the mechanical fixation location is disconnected or connected to the chassis.

4. The first antenna module of claim 1, wherein the mechanical fixation location is at a position on an opposite side of the chassis with a certain distance.

5. The first antenna module of claim 1, wherein no part of the first antenna module is fixed to the chassis.

6. The first antenna module of claim 1, wherein a distance between the first antenna array and the chassis perpendicular to the chassis is one quarter of a wavelength of signals transmitted or received by the first antenna array.

7. The first antenna module of claim 6, wherein a lateral or longitudinal distance to the chassis between the first antenna array and the mechanical fixation location is a quarter, a half, one time, or two times of a wavelength of signals transmitted or received by the first antenna array.

8. The first antenna module of claim 1, further comprising:

a first power distribution means arranged in a cantilever of the one or more cantilevers for distributing power to and delivering power from the first antenna array.

9. The first antenna module of claim 8, wherein the first power distribution means comprises one or more pairs of coaxial cables with one or more respective pairs of baluns mechanically connected to the cantilever.

10. The first antenna module of claim 9, wherein the one or more pairs of coaxial cables are directly connected to a Phase Shifter Network block.

11. The first antenna module of claim 1, wherein at least one of the one or more cantilevers has a curved or bent shape and/or is oriented at a non-right angle relative to the chassis.

12. The first antenna module of claim 1, wherein each of the one or more first antenna elements comprises a crossed dipole antenna element, the crossed dipole antenna element comprising one or more dipole arms on one side of a printed circuit board and a plurality of metal or alloy patches on the opposite side of the printed circuit board, the plurality of metal or alloy patches being connected to the dipole arms through metal or alloy deposited in corresponding through-holes formed in the printed circuit board so that each of the plurality of patches partially forms a capacitor with a corresponding dipole arm or exhibits a capacitor characteristic.

13. The first antenna module of claim 1, further comprising a movable conductive layer on an opposite side of the chassis, being configured as a ground referential layer when the first antenna module operates in a stand-alone mode.

14. The first antenna module of claim 1, further comprising one or more Frequency Selective Surfaces.

15. The first antenna module of claim 14, wherein one of the Frequency Selective Surfaces comprises at least a first surface fixed to the first antenna module and at least a second surface fixed to a second antenna module.

* * * * *